United States Patent
Masuda

(10) Patent No.: US 9,818,537 B2
(45) Date of Patent: Nov. 14, 2017

(54) CAPACITOR

(71) Applicant: TAIYO YUDEN CO., LTD., Tokyo (JP)

(72) Inventor: Hidetoshi Masuda, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/099,283

(22) Filed: Apr. 14, 2016

(65) Prior Publication Data

US 2016/0233025 A1    Aug. 11, 2016

Related U.S. Application Data

(63) Continuation of application No. PCT/JP2014/072981, filed on Sep. 2, 2014.

(30) Foreign Application Priority Data

Oct. 30, 2013  (JP) ................. 2013-225173

(51) Int. Cl.
*H01G 4/30* (2006.01)
*H01G 4/06* (2006.01)
(Continued)

(52) U.S. Cl.
CPC ............ *H01G 4/06* (2013.01); *H01G 4/00* (2013.01); *H01G 4/005* (2013.01); *H01G 4/10* (2013.01); *H01G 4/12* (2013.01); *H01G 4/228* (2013.01)

(58) Field of Classification Search
CPC ................................................ H01G 4/30
See application file for complete search history.

(56) References Cited

U.S. PATENT DOCUMENTS 8,531,816 B2 * 9/2013 Take .................. H01G 4/06 361/301.4
9,007,741 B2 * 4/2015 Masuda ............. H01G 4/06 361/301.2
(Continued)

FOREIGN PATENT DOCUMENTS

JM 2013-102103 A 5/2013
JO 4493686 B2 6/2010
(Continued)

OTHER PUBLICATIONS

International Search Report (ISR) issued in PCT/JP2014/072981 dated Oct. 2014.
(Continued)

*Primary Examiner* — Eric Thomas
(74) *Attorney, Agent, or Firm* — Chen Yoshimura LLP

(57) ABSTRACT

A capacitor includes a dielectric layer, a first conductive layer, a second conductive layer, first inner electrodes, second inner electrodes, a first external power electrode layer, a second external power electrode layer, a first outer electrode, and a second outer electrode. The first and second inner electrodes and first and second second outer electrodes are a conductive material. The dielectric layer has through-holes connecting with a first main surface and a second main surface. The first inner electrodes are in a first set of the through-holes and connected to the first conductive layer. The second inner electrodes are in a second set of the through-holes and connected to the second conductive layer. The first outer electrode is on the first external power electrode layer and some side-faces of the dielectric layer. The second outer electrode is on the second external power electrode layer and some side-faces of the dielectric layer.

5 Claims, 31 Drawing Sheets

(51) Int. Cl.
*H01G 4/00* (2006.01)
*H01G 4/10* (2006.01)
*H01G 4/12* (2006.01)
*H01G 4/005* (2006.01)
*H01G 4/228* (2006.01)

(56) References Cited

U.S. PATENT DOCUMENTS

| | | | |
|---|---|---|---|
| 9,214,277 B2 * | 12/2015 | Masuda | H01G 4/005 |
| 9,230,742 B2 * | 1/2016 | Masuda | H01G 4/10 |
| 2009/0086404 A1 | 4/2009 | Masuda et al. | |
| 2009/0195963 A1 | 8/2009 | Masuda et al. | |
| 2012/0300360 A1 * | 11/2012 | Take | H01G 4/30 |
| | | | 361/301.4 |
| 2013/0070388 A1 | 3/2013 | Take et al. | |
| 2013/0083454 A1 | 4/2013 | Masuda | |
| 2013/0120901 A1 | 5/2013 | Masuda | |
| 2013/0148259 A1 | 6/2013 | Masuda et al. | |
| 2013/0321984 A1 | 12/2013 | Masuda et al. | |
| 2014/0063690 A1 * | 3/2014 | Masuda | H01G 4/10 |
| | | | 361/321.5 |
| 2014/0153157 A1 * | 6/2014 | Masuda | H01G 4/30 |
| | | | 361/305 |

FOREIGN PATENT DOCUMENTS

| | | |
|---|---|---|
| JP | 61-29133 B2 | 7/1986 |
| JP | 2009-76850 A | 4/2009 |
| JP | 2012-114121 A | 6/2012 |
| JP | 2012-195481 A | 10/2012 |
| JP | 2013-201318 A | 10/2013 |
| WO | 2011/105312 A1 | 9/2011 |
| WO | 2012/002083 A1 | 1/2012 |

OTHER PUBLICATIONS

Written Opinion (PCT/ISA/237) issued in PCT/JP2014/072981 dated Oct. 2014. (Concise Explanation of Relevance: This Written Opinion considers that the some of claims are not described by or obvious over the reference Nos. 3-4 cited in ISR above.).
English translation of Written Opinion (PCT/ISA/237) issued in PCT/JP2014/072981 dated Oct. 2014.

* cited by examiner

CAPACITOR

BACKGROUND OF THE INVENTION

Technical Field

The present invention relates to a porous capacitor.

Background Art

Recently, porous capacitors have been developed as a new type of capacitor. A porous capacitor is a capacitor that employs a property whereby a metal oxide formed on the surface of a metal such as aluminum forms a porous structure (having fine through-holes, or pores), where inner electrodes are formed within the pores and the metal oxide is used as a dielectric.

Outer conductors are layered on a front surface and a rear surface, respectively, of the dielectric, and the inner electrodes formed within the pores are connected to either the front surface outer conductor or the rear surface outer conductor. The inner electrodes and the outer conductors to which those inner electrodes are not connected are insulated from each other by a space or an insulating material. The inner electrodes therefore function as opposing electrodes (positive-pole or negative-pole) opposed to each other with the dielectric therebetween.

For example, Patent Document 1 discloses a porous capacitor having the following configuration. First electrodes and second electrodes are formed in first holes and second holes, respectively, provided in a dielectric layer, and the first electrodes and the second electrodes are respectively connected to one of conductive layers provided on the front and rear surfaces of the dielectric layer.

RELATED ART DOCUMENTS

Patent Documents

Patent Document 1: Japanese Patent No. 4493686

Patent Document 2: Japanese Patent Application Laid-Open Publication No. 2009-76850

SUMMARY OF THE INVENTION

A porous capacitor such as that disclosed in Patent Document 1 is assumed to be mounted on a mounting substrate and used in such a state. Here, a chip component such as an MLCC (Multi-Layered Ceramic Capacitor; laminated ceramic capacitor) has a structure in which the front and rear surfaces as well as side faces of the chip are covered by conductors, and the chip is mounted on the mounting substrate with the conductors serving as connection terminals. Providing a porous capacitor with the same type of connection terminals as those in a chip component such as an MLCC therefore makes it possible to mount the porous capacitor on a mounting substrate using the same mounting method.

It has, however, been difficult to form a porous capacitor having such connection terminals. For structural reasons, porous capacitors have been manufactured by first manufacturing a structure containing many porous capacitors, which are then divided into individual units. Thus, in order to form conductors that will serve as the connection terminals on the side faces of the porous capacitor, it has been necessary to cut off individual porous capacitors and then arrange the porous capacitors in matching directions, positions, and so on with their side faces exposed. It is necessary to precisely dispose the conductive layers that will serve as connection terminals, but arranging many porous capacitors with a high level of precision is extremely difficult.

In light of the foregoing circumstances, an object of the present invention is to provide a capacitor having a terminal arrangement suited to mounting on a mounting target. Accordingly, the present invention is directed to a scheme that substantially obviates one or more of the above-discussed and other problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a capacitor, including: a dielectric layer made of a dielectric material, having a first main surface, a second main surface opposite to the first main surface, side faces, and a plurality of through-holes that each connect with the first main surface and the second main surface; a first conductive layer made of a conductive material, disposed on the first main surface of the dielectric layer; a second conductive layer made of a conductive material, disposed on the second main surface of the dielectric layer; first inner electrodes made of a conductive material partially filling a first set of through-holes among the plurality of through-holes and directly connected to the first conductive layer; second inner electrodes made of a conductive material partially filling a second set of through-holes among the plurality of through-holes and directly connected to the second conductive layer; a first external power electrode layer made of a conductive material, disposed on the first main surface of the dielectric layer and connected to the first conductive layer; a second external power electrode layer made of a conductive material, disposed on the second main surface of the dielectric layer and connected to the second conductive layer; a first outer electrode made of a conductive material, disposed on the first external power electrode layer and on at least some of the side faces of the dielectric layer; and a second outer electrode made of a conductive material, disposed on the second external power electrode layer and on at least some of the side faces of the dielectric layer.

It is to be understood that both the foregoing general description and the following detailed description are exemplary and explanatory, and are intended to provide further explanation of the invention as claimed.

DETAILED DESCRIPTION OF EMBODIMENTS

Figure 1:
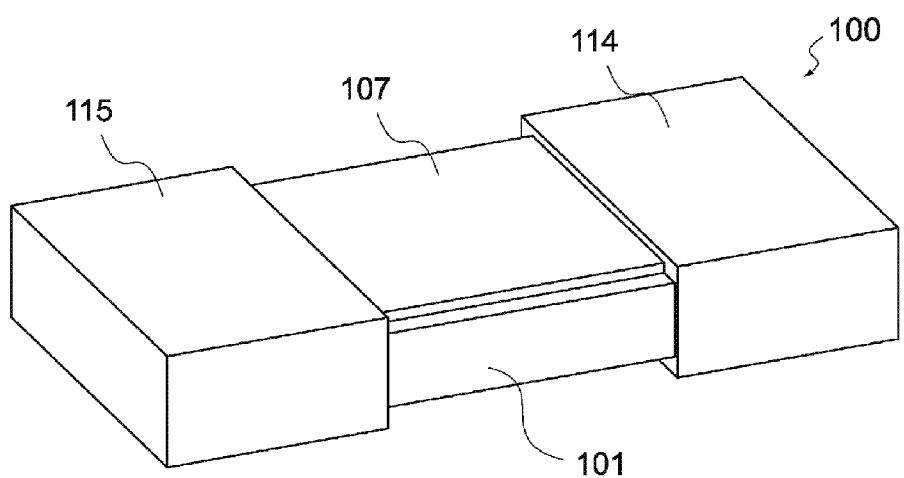
FIG. 1 is a perspective view of a capacitor according to one aspect of the present invention.

To achieve the aforementioned object, a capacitor according to an aspect of the present invention includes a dielectric layer, a first conductive layer, a second conductive layer, first inner electrodes, second inner electrodes, a first external power electrode layer, a second external power electrode layer, a first outer electrode, and a second outer electrode.

The dielectric layer is formed from a dielectric material, has a first main surface, a second main surface on the side opposite from the first main surface, and side faces, and has a plurality of through-holes that each connects with the first main surface and the second main surface.

The first conductive layer is formed from a conductive material and is disposed on the first main surface.

The second conductive layer is formed from a conductive material and is disposed on the second main surface.

The first inner electrodes are formed from a conductive material and are formed in the plurality of through-holes and connected to the first conductive layer.

The second inner electrodes are formed from a conductive material, and are formed in the plurality of through-holes and connected to the second conductive layer.

The first external power electrode layer is formed from a conductive material, and is disposed on the first main surface and connected to the first conductive layer.

The second external power electrode layer is formed from a conductive material, and is disposed on the second main surface and connected to the second conductive layer.

The first outer electrode is formed from metal plating, and is disposed upon the first external power electrode layer and side faces of the dielectric layer.

The second outer electrode is formed from metal plating, and is disposed upon the second external power electrode layer and side faces of the dielectric layer.

According to this configuration, the first outer electrode and the second outer electrode are disposed on side faces of the dielectric layer, and thus the capacitor can be mounted on a mounting substrate or the like using the same mounting method as that used for a chip component such as an MLCC. In addition, forming the first outer electrode and the second outer electrode through metal plating stabilizes the outer shape of the capacitor, as compared to a case where the stated electrodes are formed from a conductive paste. In other words, the capacitor configured as described above is suited to mounting on a mounting target.

The dielectric layer may include a capacitance region that contains some of the plurality of through-holes and is distanced from the side faces, and a conductive region that contains some of the plurality of through-holes and includes the side faces;

the first inner electrodes may be formed in the plurality of through-holes in the capacitance region;

the second inner electrodes may be formed in the plurality of through-holes in the capacitance region; and the capacitor may further include through-conductor portions, formed from a conductive material, that are formed within the plurality of through-holes in the conductive region, some of the through-conductor portions being exposed on side faces of the dielectric layer.

According to this configuration, the through-conductor portions that are exposed on side faces of the dielectric layer can be used as a plating power supply when forming the first outer electrode and the second outer electrode. The through-conductor portions can be formed in the manufacturing process that forms the first inner electrodes and the second inner electrodes in the through-holes, at the same time as those electrodes, and thus a capacitor having the stated configuration can be manufactured with the same number of manufacturing processes as for a capacitor in which the through-conductor portions are not provided on the side faces as external power electrodes.

The dielectric layer may further include an insulating region, provided between the capacitance region and the conductive region, that contains some of the plurality of through-holes; and the capacitor may further include insulating portions, formed in the plurality of through-holes in the insulating region, that are formed from spaces or an insulating material.

According to this configuration, the insulating region can be used as a region of margin for patterning when disposing the first conductive layer and the second conductive layer upon the dielectric layer. In the case where the insulating region is not provided between the capacitance region and the conductive region, the capacitance region and the conductive region will be adjacent to each other; thus if the precision of the patterning for the first conductive layer and the second conductive layer is low, those layers may extend beyond the conductive region, make contact with the through-conductor portions, and cause short-circuits. However, according to the stated configuration, such short-circuits can be prevented by the insulating region. In other words, the capacitor configured as described above has high insulation reliability.

The capacitor may further include:

a third external power electrode layer, formed from a conductive material, that is disposed on the first main surface and electrically connected to the second external power electrode layer by the through-conductor portions; and a fourth external power electrode layer, formed from a conductive material, that is disposed on the second main surface and electrically connected to the first external power electrode layer by the through-conductor portions.

According to this configuration, both the external power electrode layers connected to the first inner electrodes (the first external power electrode layer and the fourth external power electrode layer) and the external power electrode layers connected to the second inner electrodes (the second external power electrode layer and the third external power electrode layer) are formed on both the front and rear surfaces of the capacitor, and thus a capacitor in which an outer electrode connected to the first inner electrodes (the first outer electrode) and an outer electrode connected to the second inner electrode (the second outer electrode) are formed on both the front and rear surfaces can be provided. In other words, the capacitor can be mounted on a mounting target without paying attention to whether the surface of the capacitor is the front surface or the rear surface.

The dielectric layer may be formed from aluminum oxide; and the capacitor may further include:

a first protective layer, containing one of epoxy resin, silicone resin, polyimide resin, and polyolefin resin, that covers the first conductive layer; and a second protective layer, containing one of epoxy resin, silicone resin, polyimide resin, and polyolefin resin, that covers the second conductive layer.

The aluminum oxide ($Al_2O_3$) that constitutes the dielectric layer has a property whereby hydration reactions occur in high-humidity environments, producing hydrates such as boehmite. Such hydrates degrade insulation properties and may cause short-circuit failures in the capacitor. Forming the first protective layer and the second protective layer from the stated material, which has superior humidity resistance, makes it possible to prevent hydration reactions in the aluminum oxide and prevent short-circuit failures in the capacitor.

Next, a capacitor according to an embodiment of the present invention will be described.

<Capacitor Structure>

FIG. 1 is a perspective view of a capacitor 100 according to the present embodiment. As illustrated in FIG. 1, the capacitor 100 includes a first outer electrode 114 and a second outer electrode 115. The first outer electrode 114 and the second outer electrode 115 are electrically connected to a positive pole or a negative pole of the capacitor 100, and function as terminals when mounting the capacitor 100 on a mounting target (a mounting substrate or the like).

As illustrated in FIG. 1, the first outer electrode 114 and the second outer electrode 115 are formed on the front and rear surfaces as well as side faces of the capacitor 100, which makes it easy to mount the capacitor 100 on the mounting target. The structure of the capacitor 100 having the first outer electrode 114 and the second outer electrode 115 in this manner will be described hereinafter.

Figure 2:
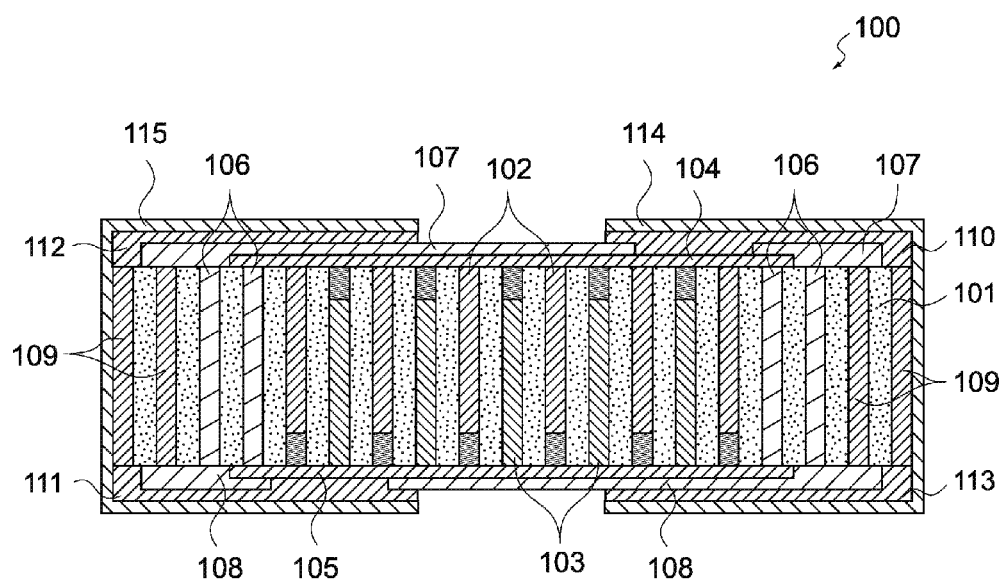
FIG. 2 is a cross-sectional view of the stated capacitor.

FIG. 2 is a cross-sectional view of the capacitor 100. As illustrated in FIG. 2, the capacitor 100 includes a dielectric layer 101, first inner electrodes 102, second inner electrodes 103, a first conductive layer 104, a second conductive layer 105, insulation portions 106, a first protective layer 107, a second protective layer 108, through-conductor portions 109, a first external power electrode layer 110, a second external power electrode layer 111, a third external power electrode layer 112, a fourth external power electrode layer 113, the first outer electrode 114, and the second outer electrode 115.

Figure 3:
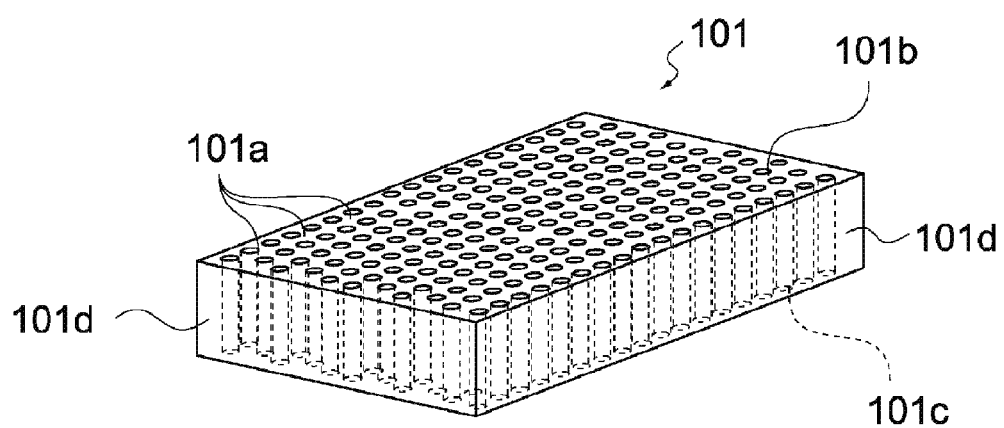
FIG. 3 is a perspective view of a dielectric layer provided in the stated capacitor.
Figure 4:
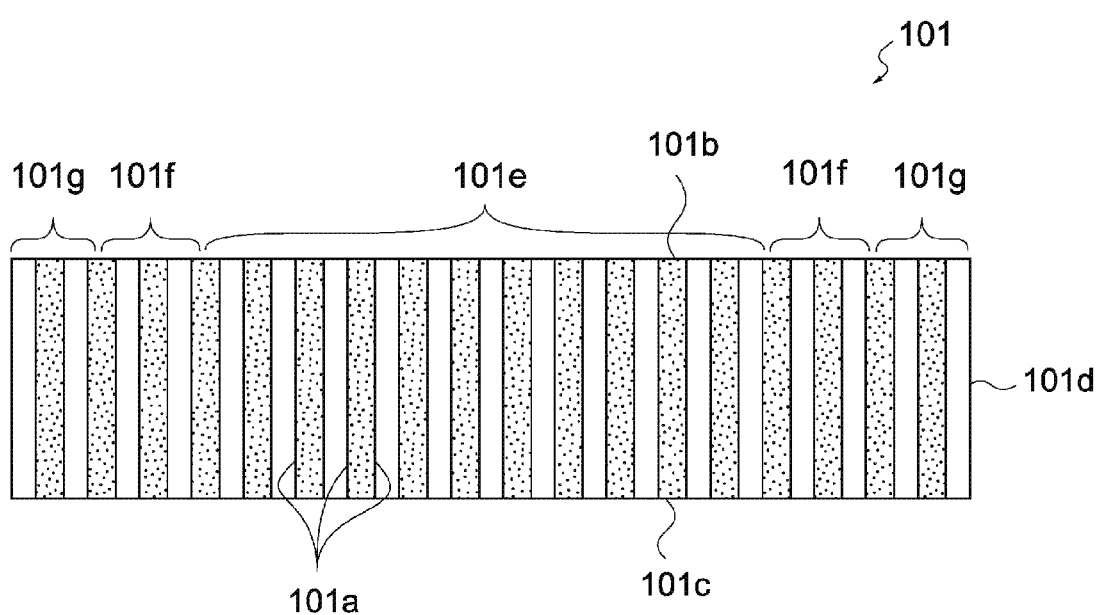
FIG. 4 is a cross-sectional view of the dielectric layer provided in the stated capacitor.

The dielectric layer 101 functions as a dielectric of the capacitor 100. FIG. 3 is a perspective view of the dielectric layer 101, and FIG. 4 is a cross-sectional view of the dielectric layer 101. A dielectric material that can form pores (fine holes) through self-assembly can be used as the dielectric layer 101. Aluminum oxide ($Al_2O_3$) can be given as an example of such a material. Although not particularly restricted, the thickness of the dielectric layer 101 can be set to several μm to several hundred μm, for example.

As illustrated in FIGS. 3 and 4, a plurality of through-holes 101a are formed in the dielectric layer 101. Assuming a surface of the dielectric layer 101 parallel to a planar direction of the layer serves as a first main surface 101b and a surface on the side opposite therefrom serves as a second main surface 101c, the through-holes 101a are formed so as to follow a direction perpendicular to the first main surface 101b and the second main surface 101c (that is, a thickness direction of the dielectric layer 101), and are formed so as to connect with the first main surface 101b and the second main surface 101c. Note that the number, size, and so on of the through-holes 101a are depicted in a simplified manner in FIG. 3 and the like, and in practice, the through-holes 101a are smaller and more numerous. In addition, the through-holes 101a may branch, and may converge with adjacent through-holes 101a. Side faces of the dielectric layer 101, relative to the first main surface 101b and the second main surface 101c, are referred to as side faces 101d.

Figure 5:
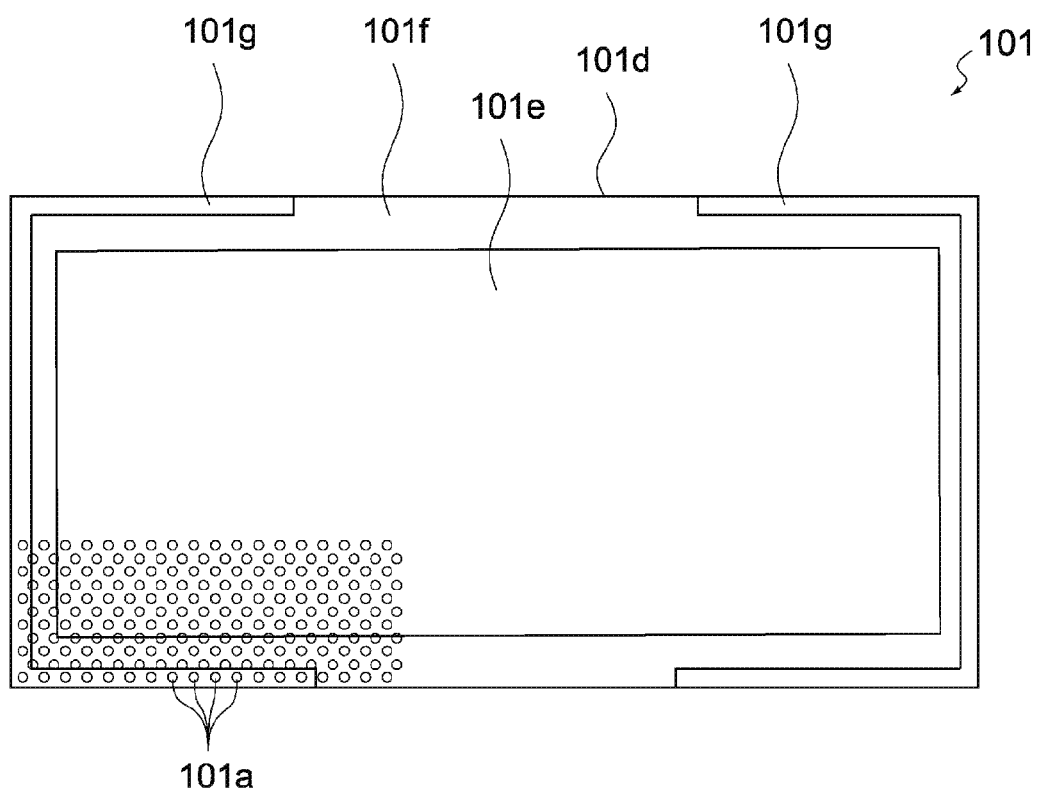
FIG. 5 is a plan view of the dielectric layer provided in the stated capacitor.
Figure 6:
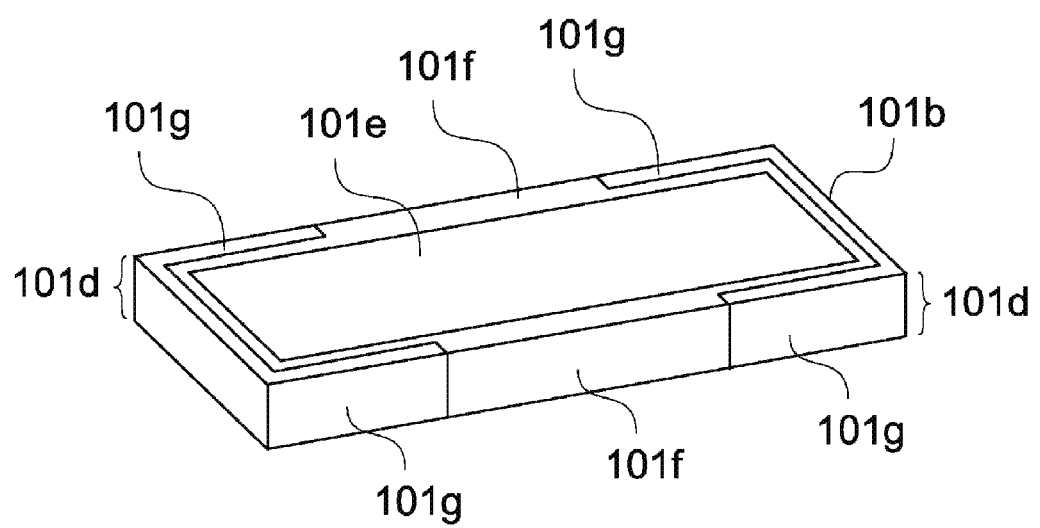
FIG. 6 is a perspective view of the dielectric layer provided in the stated capacitor.

FIG. 5 is a plan view of the dielectric layer 101, and FIG. 6 is a perspective view of the dielectric layer 101. Note that FIG. 5 only illustrates some of the through-holes 101a, whereas FIG. 6 does not illustrate any of the through-holes 101a. As illustrated in FIGS. 4 to 6, the dielectric layer 101 includes a capacitance region 101e, an insulating region 101f, and conductive regions 101g. The capacitance region 101e is a region that is separated from the side faces 101d and occupies a large part of the dielectric layer 101. The conductive regions 101g include the side faces 101d of the dielectric layer 101, and as illustrated in FIGS. 5 and 6, are constituted of two separate regions. The insulating region 101f is located between the capacitance region 101e and the conductive region 101g, and separates the two regions from each other.

As illustrated in FIG. 5, each of these regions is a region that includes a plurality of the through-holes 101a. Each region has different structures formed within the through-holes 101a, and this will be described in detail later.

Figure 7:
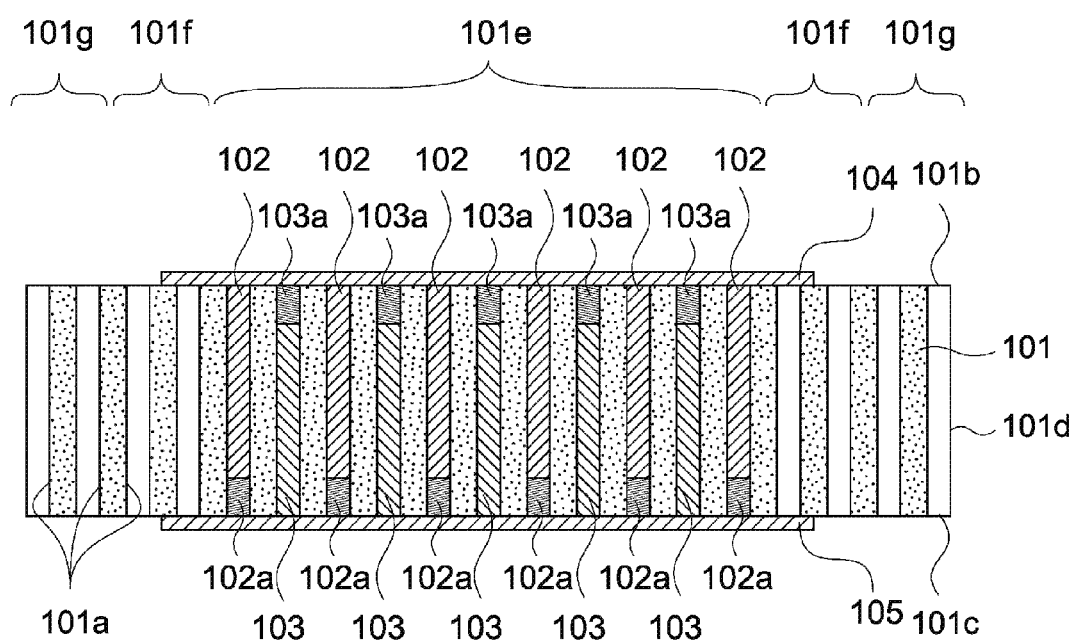
FIG. 7 is a cross-sectional view of part of the structure of the stated capacitor.

The first inner electrodes 102 function as one opposing electrode of the capacitor 100. FIG. 7 is a cross-sectional view of the structure of part of the capacitor 100. As illustrated in FIG. 7, the first inner electrodes 102 are formed within the through-holes 101a in the capacitance region 101e. A pure metal such as In, Sn, Pb, Cd, Bi, Al, Cu, Ni, Au, Ag, Pt, Pd, Co, Cr, Fe, or Zn, or an alloy thereof, can be used as the conductive material for the first inner electrodes 102.

The first inner electrodes 102 are formed so as to be connected to the first conductive layer 104 and separated from the second conductive layer 105. As illustrated in FIG. 7, insulating portions 102a constituted of an insulating material are formed between the first inner electrodes 102 and the second conductive layer 105. Meanwhile, the insulating portions 102a may instead be spaces provided between the first inner electrodes 102 and the second conductive layer 105.

The second inner electrodes 103 function as another opposing electrode of the capacitor 100. As illustrated in FIG. 7, the second inner electrodes 103 are formed within the through-holes 101a in the capacitance region 101e. A pure metal such as In, Sn, Pb, Cd, Bi, Al, Cu, Ni, Au, Ag, Pt, Pd, Co, Cr, Fe, or Zn, or an alloy thereof, can be used as the conductive material for the second inner electrodes 103.

The second inner electrodes 103 are formed so as to be connected to the second conductive layer 105 and separated from the first conductive layer 104. As illustrated in FIG. 7, insulating portions 103a constituted of an insulating material are formed between the second inner electrodes 103 and the first conductive layer 104. Meanwhile, the insulating portions 103a may instead be spaces provided between the second inner electrodes 103 and the first conductive layer 104.

Although the first inner electrodes 102 and the second inner electrodes 103 are illustrated as being arranged alternately in FIG. 7, it is not absolutely necessary that these electrodes be arranged alternately, and the electrodes may be arranged randomly instead. This is because the capacitor can be formed as long as the first inner electrodes 102 and the second inner electrodes 103 are disposed opposing each other with the dielectric layer 101 therebetween. Although the same number of first inner electrodes 102 and second inner electrodes 103 need not be provided, having the same number of each electrode increases the capacitance of the capacitor and is therefore preferable.

Figure 8:
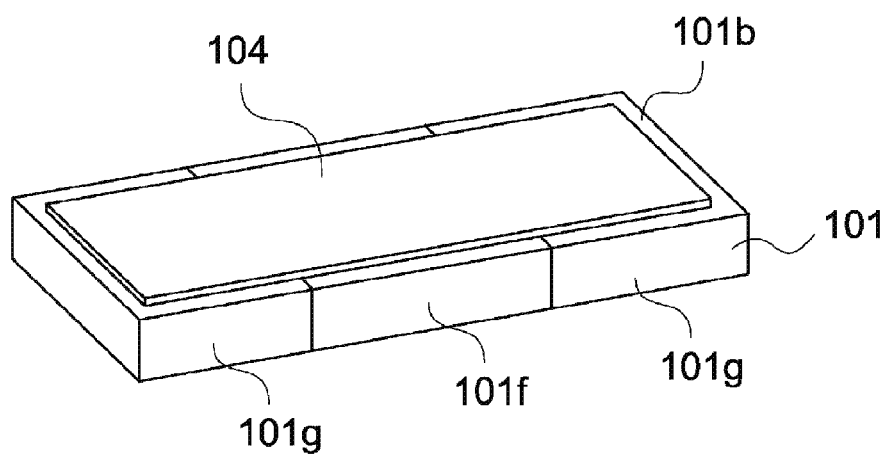
FIG. 8 is a perspective view of part of the structure of the stated capacitor.

The first conductive layer 104 electrically connects the first inner electrodes 102 to the first external power electrode layer 110 (see FIG. 2). FIG. 8 is a perspective view of the first conductive layer 104. As illustrated in FIGS. 7 and 8, the first conductive layer 104 is disposed on the first main surface 101b in the capacitance region 101e. Note that as long as the first conductive layer 104 is disposed at least in the capacitance region 101e, the first conductive layer 104 may be partially disposed in the insulating region 101f as well.

A pure metal such as Cu, Ni, Cr, Ag, Pd, Fe, Sn, Pb, Pt, Jr, Rh, Ru, Al, or Ti, or an alloy thereof, can be used as the conductive material for the first conductive layer 104. The thickness of the first conductive layer 104 can be set to several tens of nm to several µm, for example. The first conductive layer 104 can also be formed by layering a plurality of layers of conductive materials.

Figure 9:
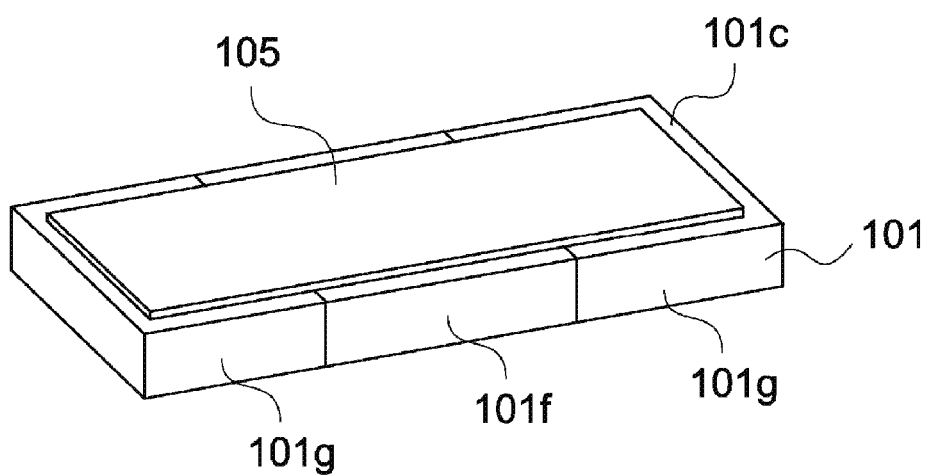
FIG. 9 is a perspective view of part of the structure of the stated capacitor.

The second conductive layer 105 electrically connects the second inner electrodes 103 to the second external power electrode layer 111 (see FIG. 2). FIG. 9 is a perspective view of the second conductive layer 105. As illustrated in FIGS. 7 and 9, the second conductive layer 105 is disposed on the second main surface 101c in the capacitance region 101e. Note that as long as the second conductive layer 105 is disposed at least in the capacitance region 101e, the second conductive layer 105 may be partially disposed in the insulating region 101f as well.

The second conductive layer 105 can be formed from the same conductive material as the first conductive layer 104, and the thickness thereof can be set to several nm to several µm, for example. The second conductive layer 105 may be formed from the same material as the first conductive layer 104 or from a different material from the first conductive layer 104. The second conductive layer 105 can also be formed by layering a plurality of layers of conductive materials.

Figure 10:
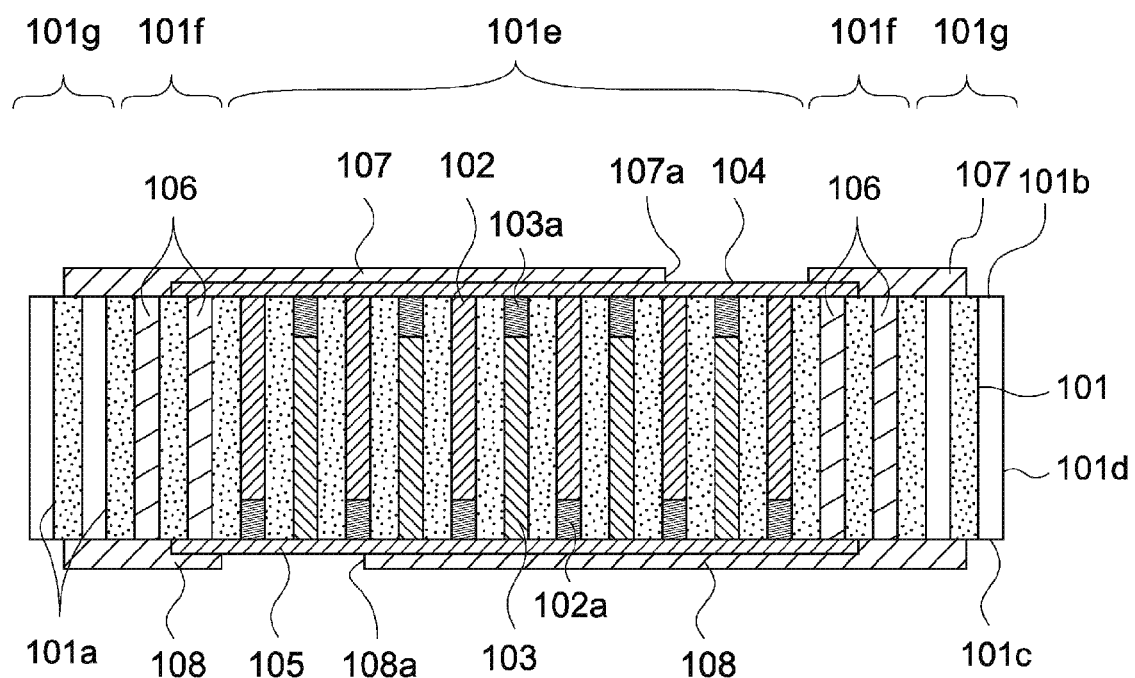
FIG. 10 is a cross-sectional view of part of the structure of the stated capacitor.

The insulation portions 106 form the insulating region 101f. FIG. 10 is a cross-sectional view of the structure of part of the capacitor 100. As illustrated in FIG. 10, the insulation portions 106 are formed within the through-holes 101a in the insulating region 101f. The insulation portions 106 can be formed from an insulating material such as a synthetic resin. The insulation portions 106 may instead be spaces formed by not filling the through-holes 101a with any material.

Figure 11:
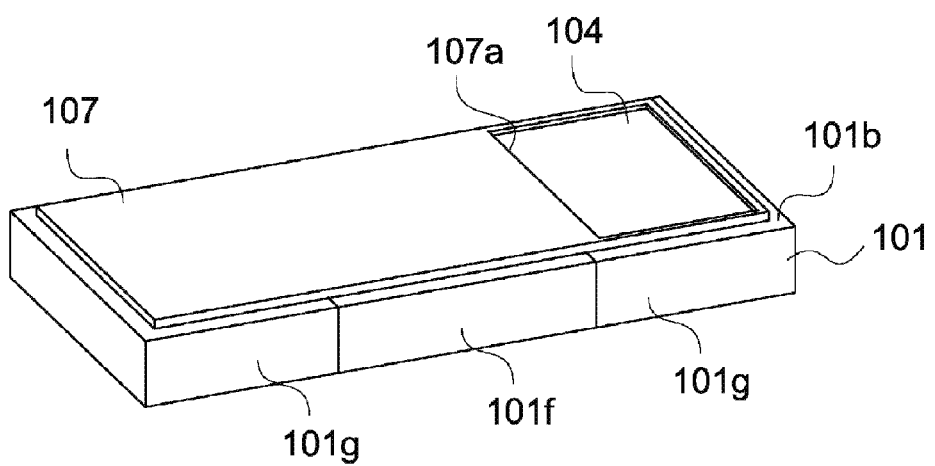
FIG. 11 is a perspective view of part of the structure of the stated capacitor.

The first protective layer 107 covers the first conductive layer 104 and insulates the first conductive layer 104 and the third external power electrode layer 112 from each other (see FIG. 2). FIG. 11 is a perspective view of the first protective layer 107. The first protective layer 107 is disposed upon the first main surface 101b, in part of the insulating region 101f and in part of the conductive regions 101g, and is furthermore disposed upon the first conductive layer 104. As illustrated in FIGS. 10 and 11, an opening 107a is formed in the first protective layer 107 above the first conductive layer 104, and the first conductive layer 104 is exposed through the opening 107a. There are no special limitations on the shape, size, and number of the opening 107a.

Figure 12:
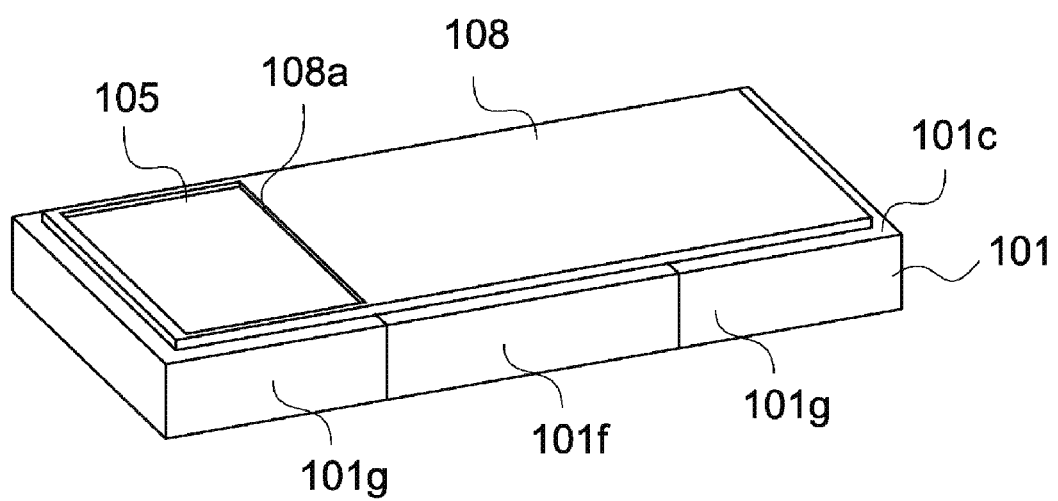
FIG. 12 is a perspective view of part of the structure of the stated capacitor.

The second protective layer 108 covers the second conductive layer 105 and insulates the second conductive layer 105 and the fourth external power electrode layer 113 from each other (see FIG. 2). FIG. 12 is a perspective view of the second protective layer 108. The second protective layer 108 is disposed upon the second main surface 101c, in part of the insulating region 101f and in part of the conductive regions 101g, and is furthermore disposed upon the second conductive layer 105. As illustrated in FIGS. 10 and 12, an opening 108a is formed in the second protective layer 108 above the second conductive layer 105, and the second conductive layer 105 is exposed through the opening 108a. There are no special limitations on the shape, size, and number of the opening 108a.

The first protective layer 107 and the second protective layer 108 are formed from an insulating material, and in particular are preferably formed from a material having superior humidity resistance. A hygroscopicity of no more than 2% and a moisture permeability of no more than 1 mg/mm$^2$ per 1 µm of thickness are preferable as indicators of humidity resistance. Epoxy resin, silicone resin, polyimide resin, or polyolefin resin can be given as examples of such a material. Forming the first protective layer 107 and the second protective layer 108 from a material having superior humidity resistance enables the first protective layer 107 and the second protective layer 108 to block moisture from the exterior environment.

The aluminum oxide ($Al_2O_3$) that constitutes the dielectric layer 101 has a property whereby hydration reactions occur in high-humidity environments, producing hydrates such as boehmite. Such hydrates degrade insulation properties and may cause short-circuit failures in the capacitor 100. Forming the first protective layer 107 and the second protective layer 108 from a material having superior humidity resistance makes it possible to prevent hydration reactions in the aluminum oxide and prevent short-circuit failures in the capacitor 100.

Figure 13:
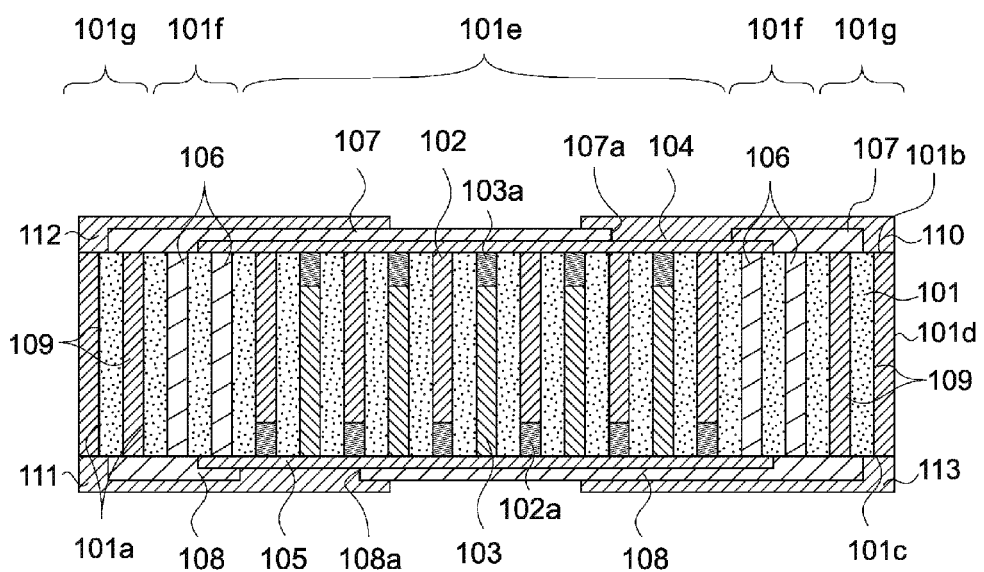
FIG. 13 is a cross-sectional view of part of the structure of the stated capacitor.

The through-conductor portions 109 form the conductive regions 101g. FIG. 13 is a cross-sectional view of the structure of part of the capacitor 100. As illustrated in FIG. 13, the through-conductor portions 109 are formed within the through-holes 101a in the conductive regions 101g.

Some of the through-conductor portions 109 are connected to the first external power electrode layer 110 and the fourth external power electrode layer 113, electrically connecting the stated layers to each other. Other through-conductor portions 109 are connected to the second external power electrode layer 111 and the third external power electrode layer 112, electrically connecting the stated layers to each other. A pure metal such as In, Sn, Pb, Cd, Bi, Al, Cu, Ni, Au, Ag, Pt, Pd, Co, Cr, Fe, or Zn, or an alloy thereof, can be used as the conductive material for the through-conductor portions 109.

Figure 14:
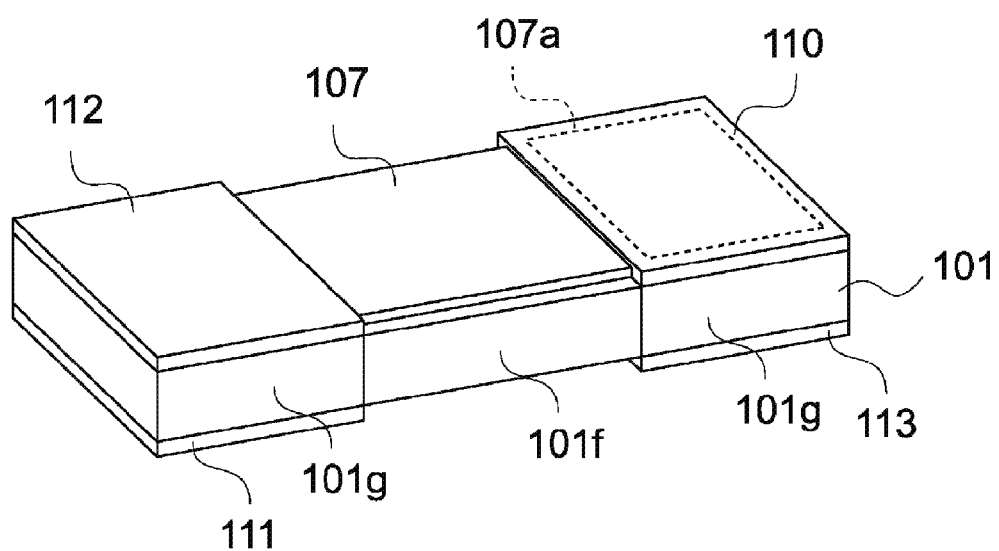
FIG. 14 is a perspective view of part of the structure of the stated capacitor.

The first external power electrode layer 110 electrically connects the first conductive layer 104 to the first outer electrode 114 (see FIG. 2). FIG. 14 is a perspective view of the first external power electrode layer 110. As illustrated in FIGS. 13 and 14, the first external power electrode layer 110 is disposed upon the first main surface 101b, and is furthermore disposed upon the first protective layer 107. The first external power electrode layer 110 is connected to the first conductive layer 104 through the opening 107a provided in the first protective layer 107.

A pure metal such as Cu, Ni, Cr, Ag, Pd, Fe, Sn, Pb, Pt, Jr, Rh, Ru, Al, or Ti, or an alloy thereof, can be used as the conductive material for the first external power electrode layer 110. The thickness of the first external power electrode layer 110 can be set to several tens of nm to several μm, for example. The first external power electrode layer 110 can also be formed by layering a plurality of layers of conductive materials.

Figure 15:
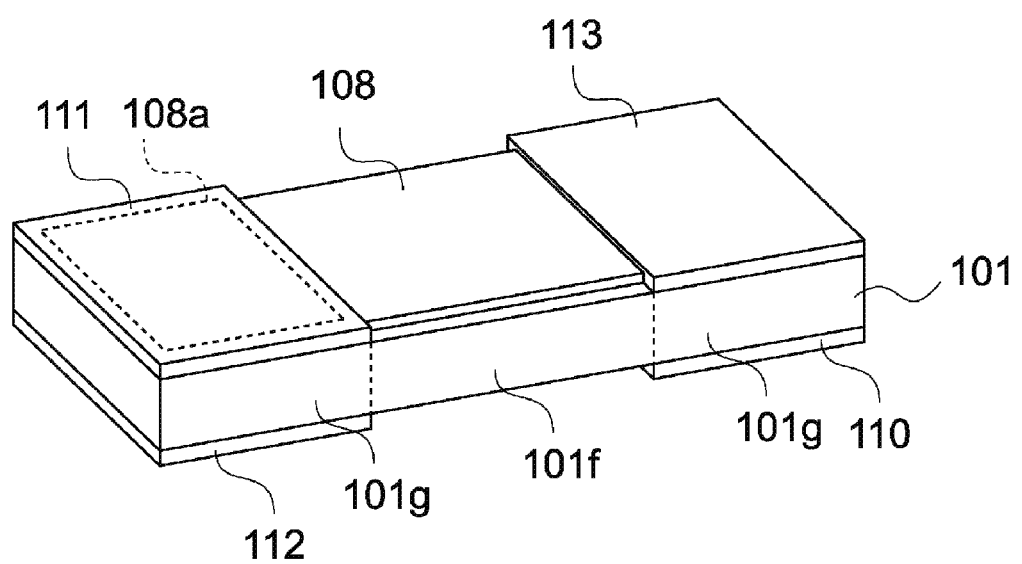
FIG. 15 is a perspective view of part of the structure of the stated capacitor.

The second external power electrode layer 111 electrically connects the second conductive layer 105 to the second outer electrode 115 (see FIG. 2). FIG. 15 is a perspective view of the second external power electrode layer 111. As illustrated in FIGS. 13 and 15, the second external power electrode layer 111 is disposed upon the second main surface 101c, and is furthermore disposed upon the second protective layer 108. The second external power electrode layer 111 is connected to the second conductive layer 105 through the opening 108a provided in the second protective layer 108.

A pure metal such as Cu, Ni, Cr, Ag, Pd, Fe, Sn, Pb, Pt, Jr, Rh, Ru, Al, or Ti, or an alloy thereof, can be used as the conductive material for the second external power electrode layer 111. The thickness of the second external power electrode layer 111 can be set to several tens of nm to several μm, for example. The second external power electrode layer 111 can also be formed by layering a plurality of layers of conductive materials.

The third external power electrode layer 112 electrically connects the through-conductor portions 109 to the second outer electrode 115 (see FIG. 2). As illustrated in FIGS. 13 and 14, the third external power electrode layer 112 is disposed upon the first main surface 101b, and is furthermore disposed upon the first protective layer 107. The third external power electrode layer 112 is insulated from the first conductive layer 104 and the first external power electrode layer 110 by the first protective layer 107.

A pure metal such as Cu, Ni, Cr, Ag, Pd, Fe, Sn, Pb, Pt, Jr, Rh, Ru, Al, or Ti, or an alloy thereof, can be used as the conductive material for the third external power electrode layer 112. The thickness of the third external power electrode layer 112 can be set to several tens of nm to several μm, for example. The third external power electrode layer 112 can also be formed by layering a plurality of layers of conductive materials.

The fourth external power electrode layer 113 electrically connects the through-conductor portions 109 to the first outer electrode 114 (see FIG. 2). As illustrated in FIGS. 13 and 15, the fourth external power electrode layer 113 is disposed upon the second main surface 101c, and is furthermore disposed upon the second protective layer 108. The fourth external power electrode layer 113 is insulated from the second conductive layer 105 and the second external power electrode layer 111 by the second protective layer 108.

A pure metal such as Cu, Ni, Cr, Ag, Pd, Fe, Sn, Pb, Pt, Jr, Rh, Ru, Al, or Ti, or an alloy thereof, can be used as the conductive material for the fourth external power electrode layer 113. The thickness of the fourth external power electrode layer 113 can be set to several tens of nm to several μm, for example. The fourth external power electrode layer 113 can also be formed by layering a plurality of layers of conductive materials.

As described above, the first external power electrode layer 110 and the fourth external power electrode layer 113 are electrically connected by the through-conductor portions 109, and the second external power electrode layer 111 and the third external power electrode layer 113 are electrically connected by the through-conductor portions 109. Here, the conductive regions 101g in which the through-conductor portions 109 are formed include side faces 101d of the dielectric layer 101, as mentioned above. As such, some of the through-conductor portions 109 that are located furthest on the outer periphery of the dielectric layer 101 are exposed on side faces 101d.

Figure 16:
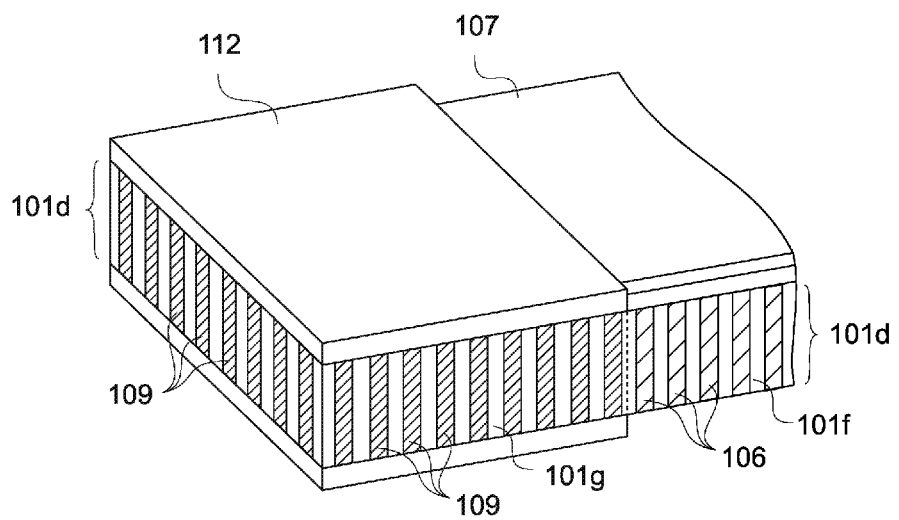
FIG. 16 is an enlarged perspective view of the stated capacitor.

FIG. 16 is a cross-sectional view of the through-conductor portions 109 exposed on side faces 101d, and is an enlargement of part of FIG. 14. As illustrated in FIG. 16, the through-conductor portions 109 are exposed in regions of the side faces 101d that are within the conductive regions 101g (see FIG. 5). In addition, the insulation portions 106 are exposed in a region of the side faces 101d that is within the insulating region 101f. However, the insulation portions 106 do not absolutely have to be exposed on the side faces 101d.

The first outer electrode 114 functions as one of a positive-polarity or negative-polarity terminal of the capacitor 100 (the first inner electrodes 102 or the second inner electrodes 103). As illustrated in FIGS. 1 and 2, the first outer electrode 114 is disposed upon the first external power electrode layer 110 and the fourth external power electrode layer 113, and is also disposed upon the side faces 101d between the first external power electrode layer 110 and the fourth external power electrode layer 113. The first outer electrode 114 is electrically connected to the first inner electrodes 102 by the first external power electrode layer 110 and the first conductive layer 104, or in other words, functions as a terminal that connects the first inner electrodes 102 to the exterior.

The first outer electrode 114 can be formed through metal plating, and can be formed through electroplating that uses the first external power electrode layer 110, the fourth external power electrode layer 113, and the through-conductor portions 109 exposed on the side faces 101*d* (see FIG. 16) for the plating power supply. As described above, having the through-conductor portions 109 exposed on the side faces 101*d* makes it possible to dispose the first outer electrode 114 upon the side faces 101*d*.

The second outer electrode 115 functions as the other of a positive-polarity or negative-polarity terminal of the capacitor 100. As illustrated in FIGS. 1 and 2, the second outer electrode 115 is disposed upon the second external power electrode layer 111 and the third external power electrode layer 112, and is also disposed upon the side faces 101*d* between the second external power electrode layer 111 and the third external power electrode layer 112. The second outer electrode 115 is electrically connected to the second inner electrodes 103 by the second external power electrode layer 111 and the second conductive layer 105, or in other words, functions as a terminal that connects the second inner electrodes 103 to the exterior.

The second outer electrode 115 can be formed through metal plating, and can be formed through electroplating that uses the second external power electrode layer 111, the third external power electrode layer 112, and the through-conductor portions 109 exposed on the side faces 101*d* (see FIG. 16) for the plating power supply. As described above, having the through-conductor portions 109 exposed on the side faces 101*d* makes it possible to dispose the second outer electrode 115 upon the side faces 101*d*.

Figure 17:
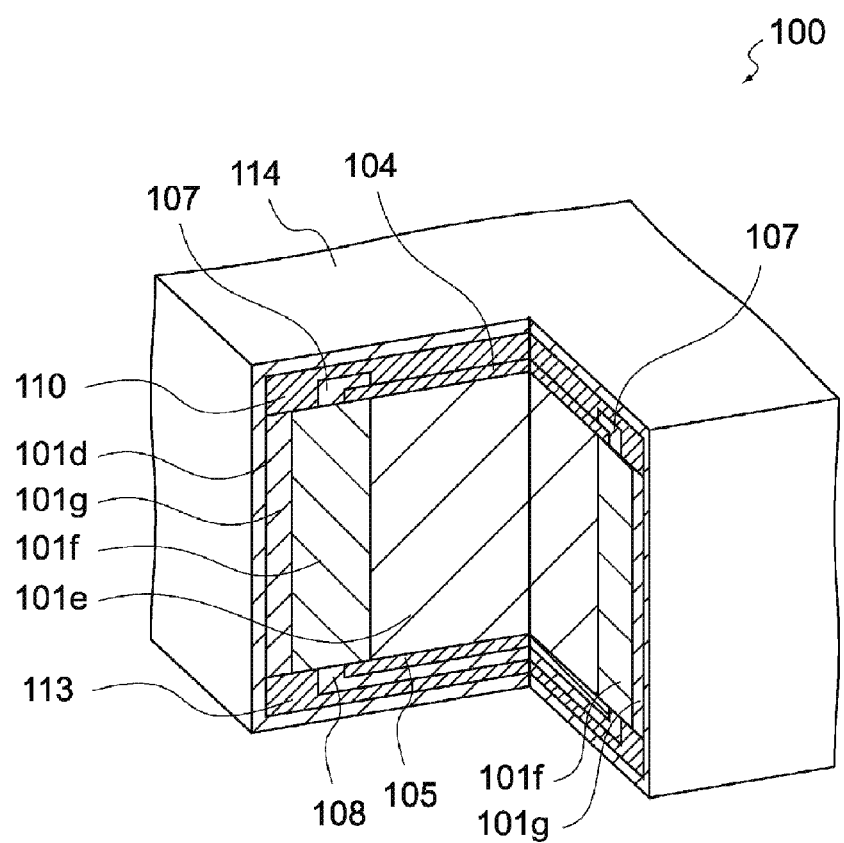
FIG. 17 is a cross-sectional perspective view of the stated capacitor.

The capacitor 100 has the configuration described thus far. FIG. 17 is a cross-sectional perspective view of the capacitor 100. As illustrated in FIGS. 1 and 17, in the capacitor 100, the first outer electrode 114 and the second outer electrode 115 are also disposed on the side faces 101*d* of the dielectric layer 101. Such an outer electrode (terminal) arrangement is the same as the terminal arrangement in a chip component such as an MLCC (multi-layered ceramic capacitor; laminated ceramic capacitor), and thus the capacitor 100 can be mounted on a mounting substrate or the like using the same mounting method as that used for such chip components.

Meanwhile, forming the first outer electrode 114 and the second outer electrode 115 through metal plating stabilizes the outer shape of the capacitor 100. External power electrodes (terminals) of porous capacitors have thus far generally been formed from conductive paste, and the thickness of the conductive paste is not uniform when the paste is applied, when the paste hardens, and so on. As opposed to this, according to the capacitor 100, the first outer electrode 114 and the second outer electrode 115 are formed through metal plating and the thicknesses thereof can therefore be made uniform. Furthermore, the capacitor 100 can be manufactured without difficulty in terms of handling and the like by using the manufacturing method described hereinafter.

<Method for Manufacturing Capacitor>

A method for manufacturing the capacitor 100 will be described. The capacitor 100 can be manufactured by first creating a structure including a plurality of capacitors 100 ("capacitor structure" hereinafter) and then dividing that structure into individual capacitors 100. FIGS. 18A to 28B are cross-sectional views illustrating a process for manufacturing a portion of the capacitor structure corresponding to a single capacitor 100. FIGS. 29A to 30B are perspective views illustrating the process for manufacturing the capacitor structure, and illustrate a structure from which four capacitors 100 are produced. In actuality, several to several tens of thousands of capacitors 100 can be produced from a single capacitor structure.

Figure 18A:
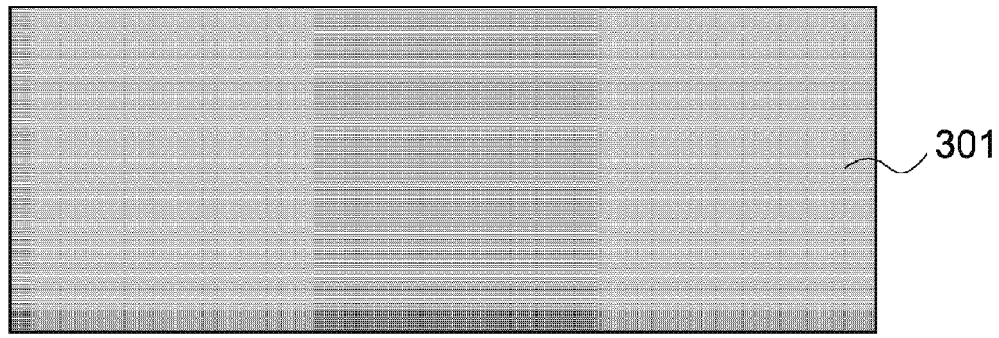
FIGS. 18A to 18C are schematic diagrams illustrating a process for manufacturing the stated capacitor.

FIG. 18A illustrates a base material 301 serving as the basis of the dielectric layer 101. The base material 301 is a metal prior to the oxidization that produces the metal oxide serving as the dielectric layer 101, and metallic aluminum can be used as the base material 301 in the case where aluminum oxide is used as the metal oxide.

Figure 18B:
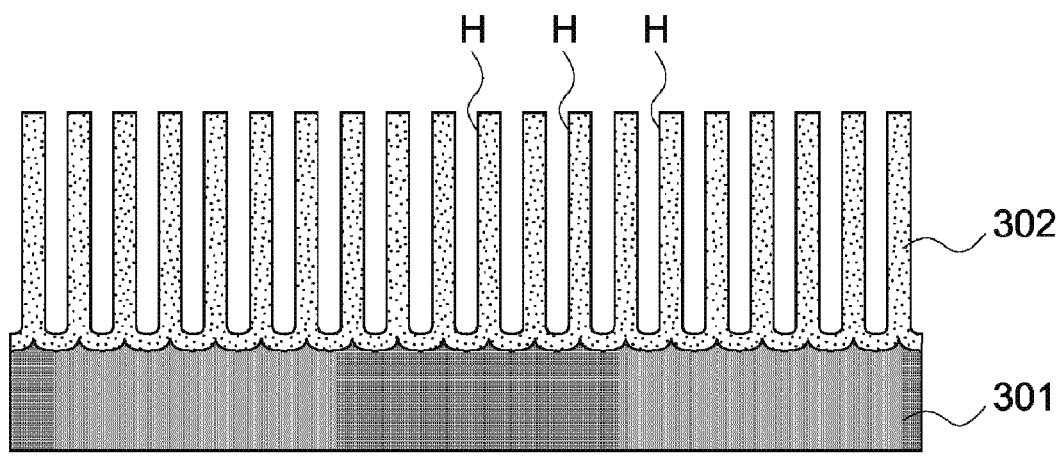

When the base material 301 is anodized, the base material 301 is oxidized and a metal oxide 302 is formed, as illustrated in FIG. 18B. At this time, holes H are formed in the metal oxide 302 due to a self-assembly effect in the metal oxide 302. The holes H grow in the direction in which the oxidization proceeds, or in other words, in a thickness direction of the base material 301. The anodization can be carried out by applying a voltage using the base material 301 as an anode in an oxalic acid (0.1 mol/l) solution adjusted to 15° C. to 20° C., for example. A voltage of several V to several hundreds of V can be applied, with a processing time of several minutes to several days. For example, holes H having a diameter of 100 nm are formed by applying a voltage of 40V.

Note that regular pits (depressions) can be formed in the base material 301 before the anodization, and the holes H may then be grown using the pits as starting points. Placing pits in this manner makes it possible to control the arrangement of the holes H. The pits can be formed by pressing the base material 301 into a mold, for example.

Figure 18C:
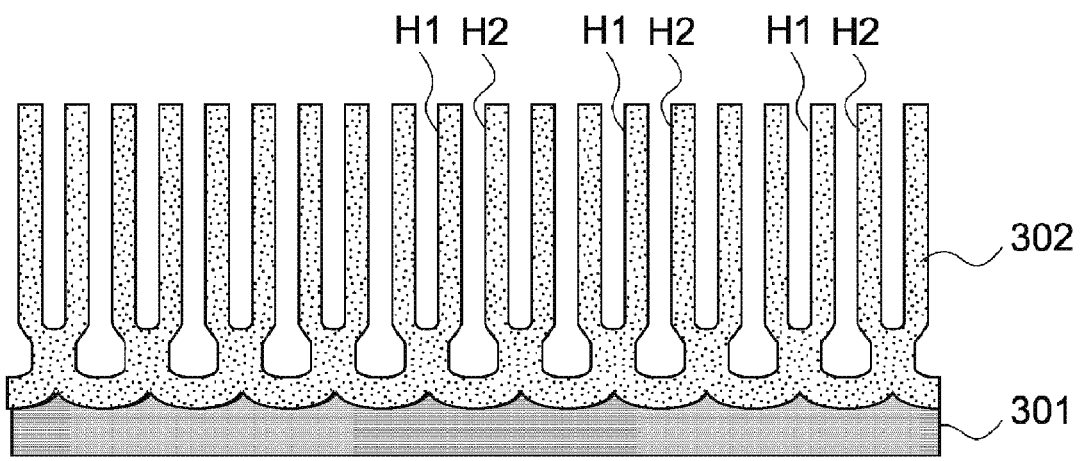

By increasing the voltage applied to the base material 301 once the stated anodizing has progressed to a certain extent, the self-assembly will proceed such that the pitch (diameter and distance between holes) of some of the holes H increases, as illustrated in FIG. 18C. Increasing the pitch of these holes H will stop the formation of the other holes H. Hereinafter, the holes H whose formation has been stopped will be referred to as holes H1, and the holes H whose formation has continued (whose diameters have increased) will be referred to as holes H2.

A voltage of several times the aforementioned voltage can be applied at this time, and a processing time of several minutes to several tens of minutes can be used. For example, the diameters of the holes H2 are expanded to 200 nm by applying a voltage of 80V. The numbers of holes H1 and holes H2 can be made approximately the same by setting the voltage applied during the first stage of anodization illustrated in FIG. 18B and the voltage applied during the second stage of anodization illustrated in FIG. 18C to be within the above-described ranges. Furthermore, setting the voltage application processing time in the second stage to be within the above-described range makes it possible to reduce the thickness of the metal oxide 302 formed at a base area through the second stage of voltage application while ensuring that the pitch conversion of the holes H2 is sufficiently completed. The metal oxide 302 formed through the second stage of voltage application is removed during subsequent processes, and it is thus preferable for the metal oxide 302 to be as thin as possible.

Figure 19A:
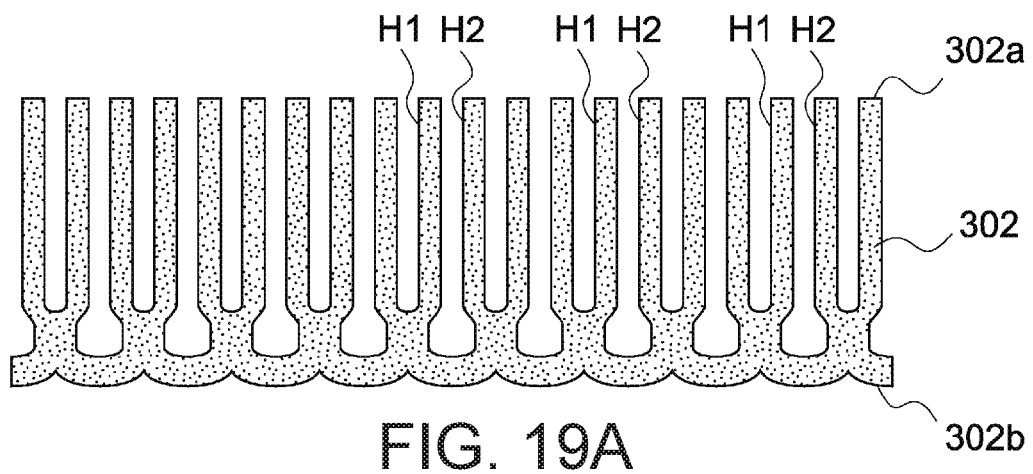
FIGS. 19A to 19C are schematic diagrams illustrating the process for manufacturing the stated capacitor.

Next, the unoxidized base material 301 is removed, as illustrated in FIG. 19A. The base material 301 can be removed through wet etching, for example. Hereinafter, the surface of the metal oxide 302 in which the holes H are formed will be referred to as a front surface 302*a*, and the surface on the side opposite therefrom will be referred to as a rear surface 302*b*.

Figure 19B:
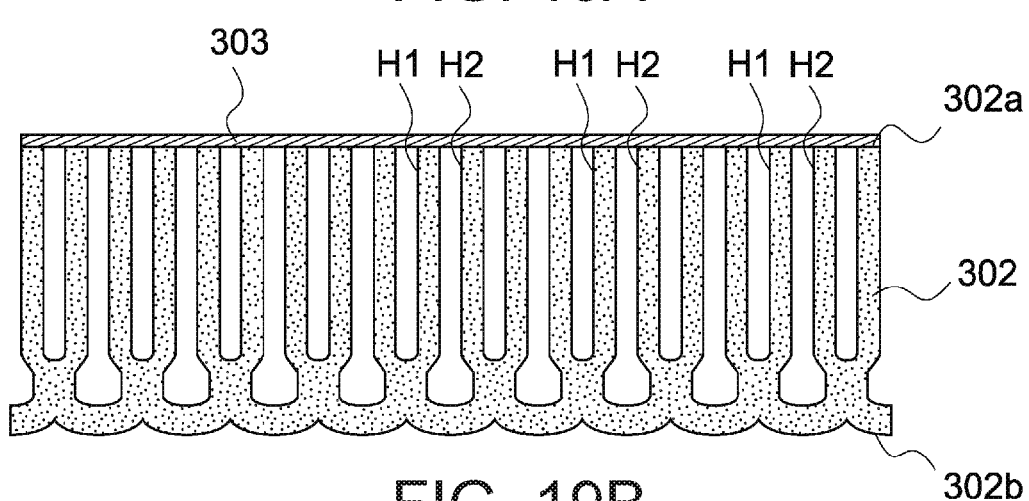

Next, a first conductive layer 303 is formed from a conductive material on the front surface 302*a*, as illustrated in FIG. 19B. The first conductive layer 303 can be formed through various types of deposition techniques, such as sputtering, vacuum deposition, or the like.

Figure 19C:
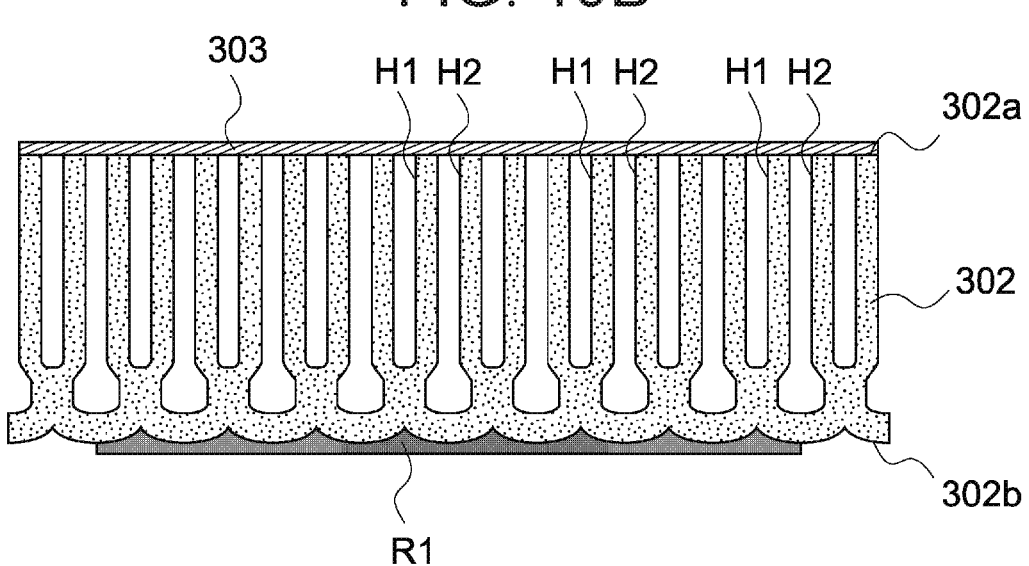

Next, an etching resist R1 is formed in a region corresponding to part of the rear surface 302b, as illustrated in FIG. 19C. The etching resist R1 can be patterned through photolithography, for example.

Figure 29A:
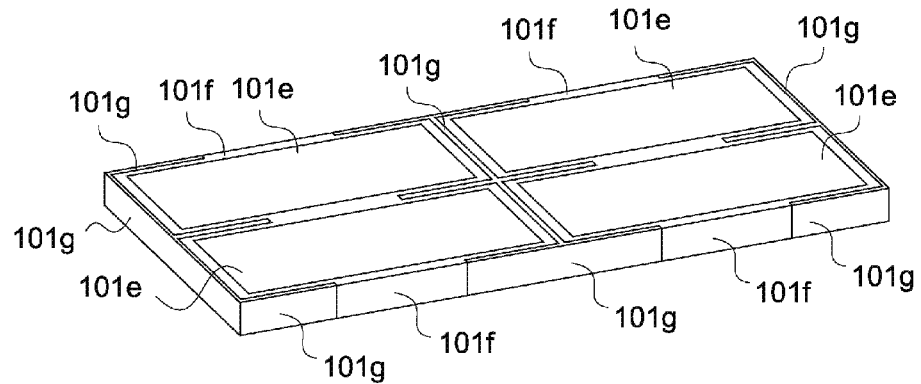
FIGS. 29A to 29C are perspective views illustrating a process for manufacturing a capacitor structure from which the stated capacitor is produced.

The region where the etching resist R1 is formed will serve as the above-described capacitance region 101e and insulating region 101f of the dielectric layer 101. FIG. 29A illustrates the distribution of regions on the dielectric layer 101 in the capacitor structure. As illustrated in FIG. 29A, the capacitance region 101e and the insulating region 101f are partially segmented by the conductive regions 101g, and the regions where the etching resist R1 is not formed in FIG. 19C will serve as the conductive regions 101g.

Figure 20A:
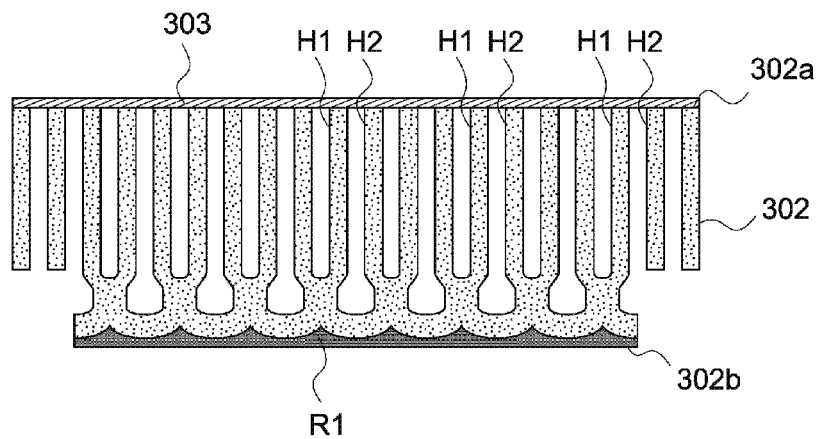
FIGS. 20A to 20C are schematic diagrams illustrating the process for manufacturing the stated capacitor.

Next, a prescribed thickness of the metal oxide 302 is removed from the rear surface 302b side, as illustrated in FIG. 20A. This can be carried out through reactive ion etching (REI), for example. The metal oxide 302 in the region of the rear surface 302b covered by the etching resist R1 is not removed. The thickness that is removed is a thickness that enables the holes H1 to connect with the rear surface 302b.

Figure 20B:
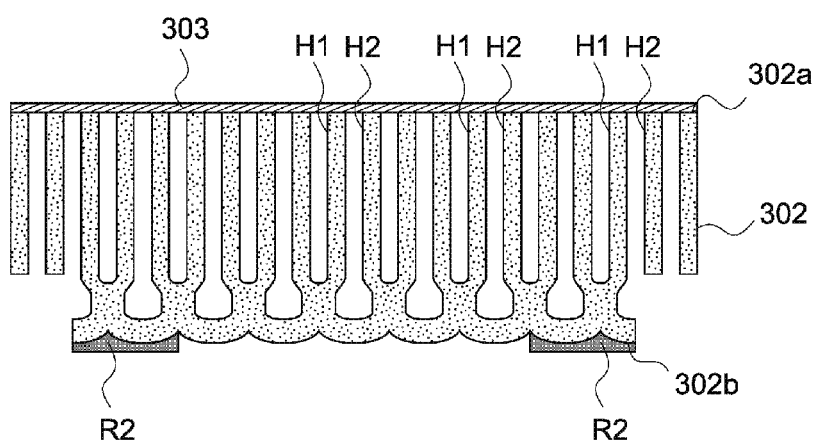

Next, the etching resist R1 is further patterned to form an etching resist R2, as illustrated in FIG. 20B. This patterning can be carried out through photolithography, for example. The region where the etching resist R2 is formed will serve as the above-described insulating region 101f of the dielectric layer 101 (see FIG. 29A).

Figure 20C:
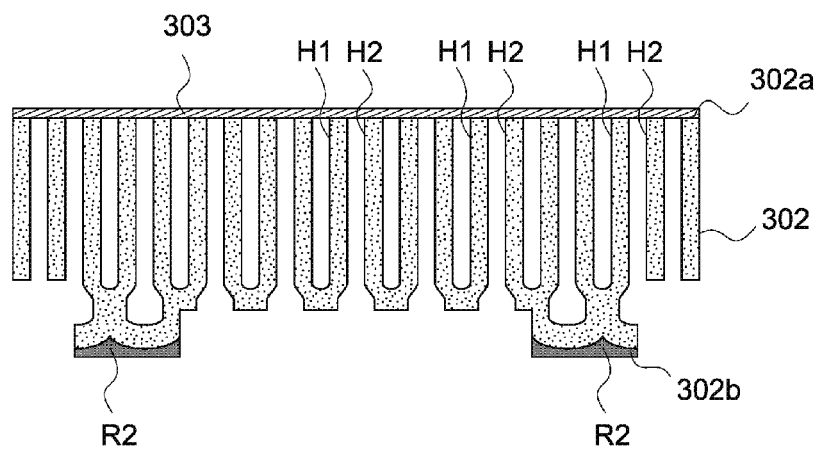

Next, a prescribed thickness of the metal oxide 302 is once again removed from the rear surface 302b side, as illustrated in FIG. 20C. This can be carried out through REI, for example. The metal oxide 302 in the region of the rear surface 302b covered by the etching resist R2 is not removed. The thickness that is removed is a thickness that enables the holes H2 that remained unopened to connect with the rear surface 302b.

Figure 21A:
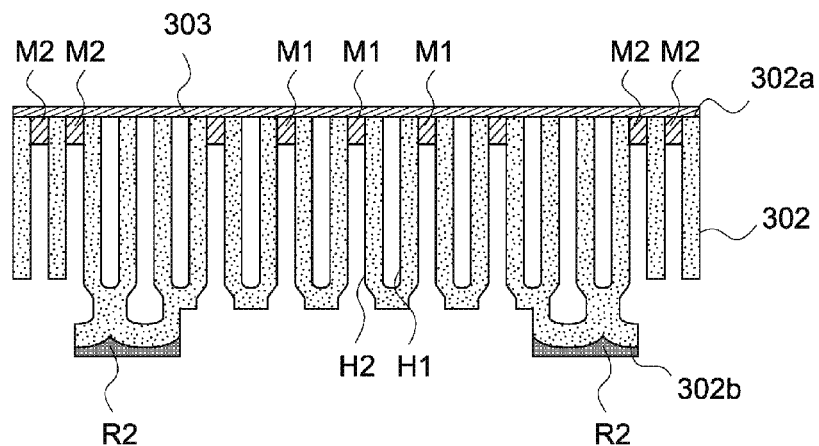
FIGS. 21A to 21C are schematic diagrams illustrating the process for manufacturing the stated capacitor.

Next, as illustrated in FIG. 21A, first plate conductors M1 and second plate conductors M2 are disposed within the holes H1 and holes H2 that connect with the rear surface 302b. The first plate conductors M1 and the second plate conductors M2 are formed from a conductive material, and can be disposed through electroplating of the metal oxide 302 using the first conductive layer 303 for the plating power supply. Plating liquid does not enter into the holes H1 and holes H2 that do not connect with the rear surface 302b, and thus plating conductors are not formed within those holes.

Figure 21B:
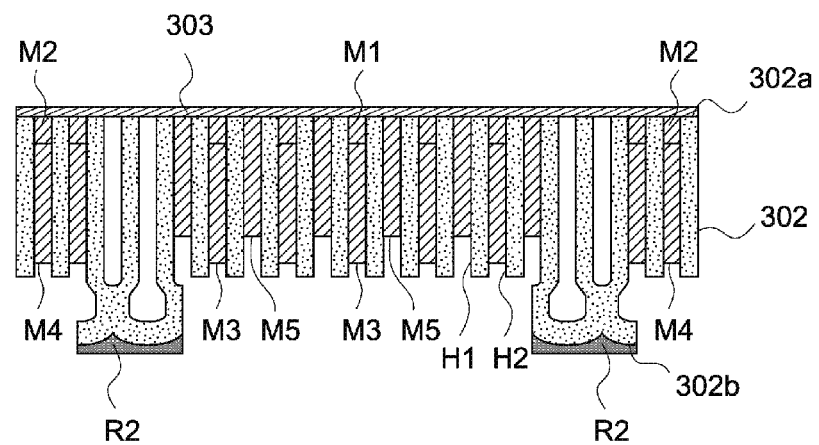

Next, a prescribed thickness of the metal oxide 302 is once again removed from the rear surface 302b side, as illustrated in FIG. 21B. This can be carried out through REI, for example. The metal oxide 302 in the region of the rear surface 302b covered by the etching resist R2 is not removed. The thickness that is removed is a thickness that enables the holes H1 that remained unopened to connect with the rear surface 302b.

Figure 21C:
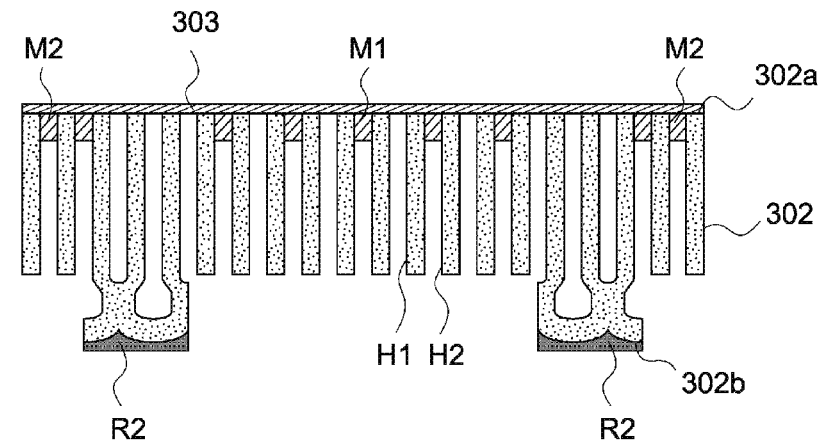

Next, as illustrated in FIG. 21C, third plate conductors M3, fourth plate conductors M4, and fifth plate conductors M5 are formed within the holes H1 and holes H2. The third plate conductors M3, the fourth plate conductors M4, and the fifth plate conductors M5 are formed from a conductive material, and can be disposed through electroplating of the metal oxide 302 using the first conductive layer 303 for the plating power supply.

The third plate conductors M3 are formed upon the first plate conductors M1, and the fourth plate conductors M4 are formed upon the second plate conductors M2. The fifth plate conductors M5 are formed upon the first conductive layer 303. Accordingly, leading ends of the third plate conductors M3 and the fourth plate conductors M4 are located at approximately the same positions, whereas leading ends of the fifth plate conductors M5 are located closer to the first conductive layer 303 than the leading ends of the third plate conductors M3 and the fourth plate conductors M4. Plating liquid does not enter into the holes H1 and holes H2 that do not connect with the rear surface 302b, and thus plating conductors are not formed within those holes.

Note that in the following descriptions, the fifth plate conductors M5 are referred to as first inner conductors 304 and the first plate conductors M1 and third plate conductors M3 are referred to collectively as second inner conductors 305. The second plate conductors M2 and the fourth plate conductors M4 are referred to collectively as third inner conductors 306. Furthermore, the first inner conductors 304, the second inner conductors 305, and the third inner conductors 306 are referred to collectively as inner conductors or the like.

Figure 22A:
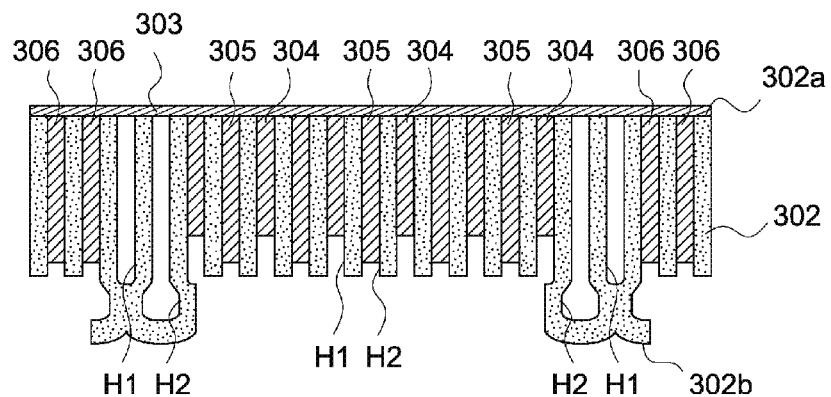
FIGS. 22A to 22C are schematic diagrams illustrating the process for manufacturing the stated capacitor.

Next, the etching resist R2 is removed, as illustrated in FIG. 22A. The etching resist R2 can be removed through wet etching, for example.

Figure 22B:
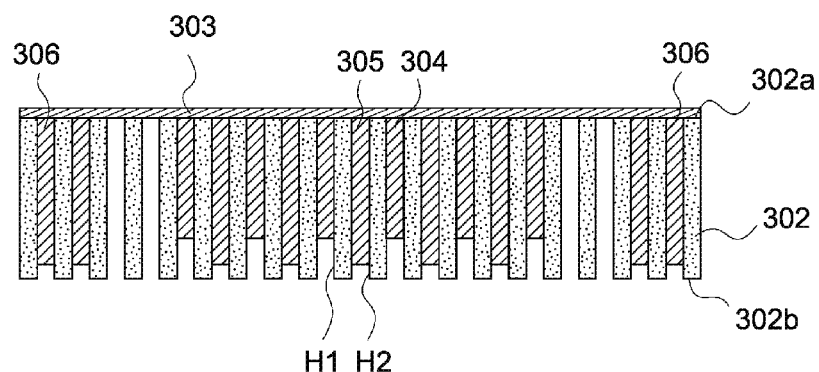

Next, a prescribed thickness of the metal oxide 302 is removed from the rear surface 302b side, as illustrated in FIG. 22B. This can be carried out through REI, for example. The thickness that is removed is a thickness that enables the holes H1 that remained unopened to connect with the rear surface 302b.

Figure 22C:
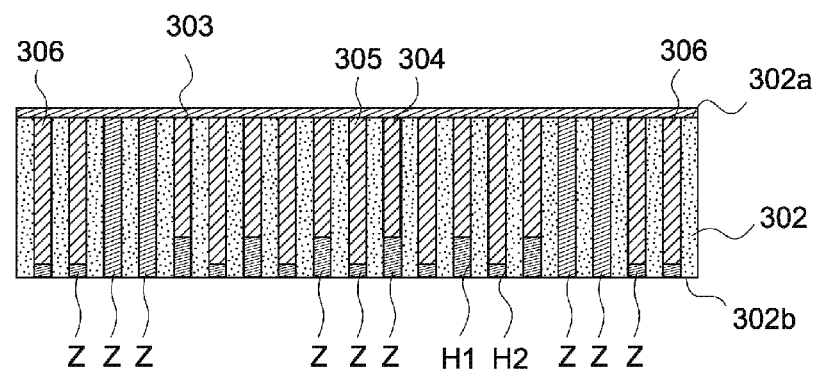

Next, spaces in the holes H1 and holes H2 are filled with an insulating material Z, as illustrated in FIG. 22C. Because inner electrodes or the like are already formed in some of the holes H1 and holes H2, the insulating material Z is filled from the inner electrodes or the like to the openings of the holes H1 or holes H2. The holes H1 and holes H2 in which inner electrodes or the like are not formed are completely filled with the insulating material Z. As long as a sufficient amount can be supplied to the openings of the holes H1 and holes H2 through screen printing, for example, the holes H1 and holes H2 can easily be filled with the insulating material Z through a capillary phenomenon.

Figure 23A:
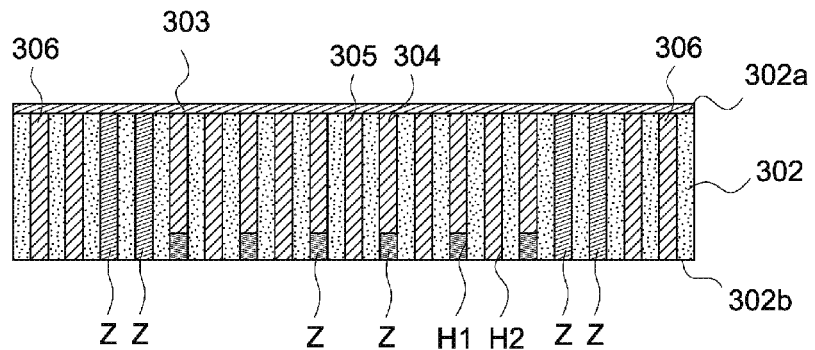
FIGS. 23A to 23C are schematic diagrams illustrating the process for manufacturing the stated capacitor.

Next, a prescribed thickness of the metal oxide 302 is once again removed from the rear surface 302b, as illustrated in FIG. 23A. This removal can be carried out through CMP (chemical mechanical polishing), for example. Here, the metal oxide 302 is removed by a thickness that exposes the second inner conductors 305 on the rear surface 302b but does not expose the first inner conductors 304 on the rear surface 302b. The insulating material Z that had been above the second inner conductors 305 is removed as a result. However, the insulating material Z that is above the first inner conductors 304 remains.

Figure 23B:
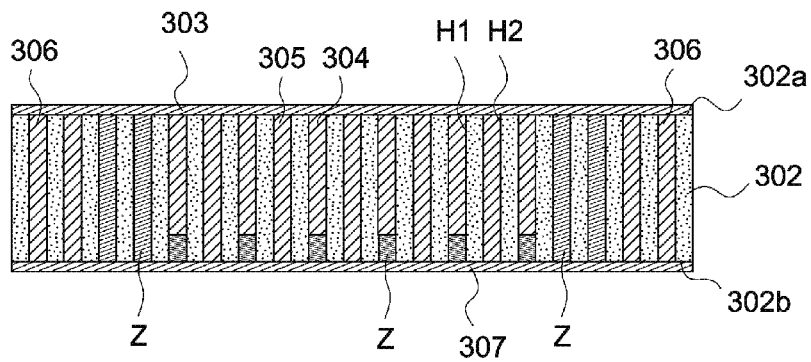

Next, a second conductive layer 307 is formed from a conductive material on the rear surface 302b, as illustrated in FIG. 23B. The second conductive layer 307 can be formed through various types of deposition techniques, such as sputtering, vacuum deposition, or the like.

Figure 23C:
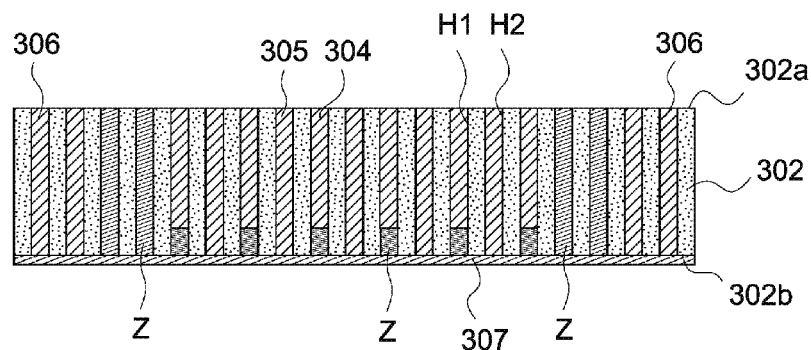

Next, the first conductive layer 303 is removed, as illustrated in FIG. 23C. The first conductive layer 303 can be removed through CMP, for example.

Figure 24A:
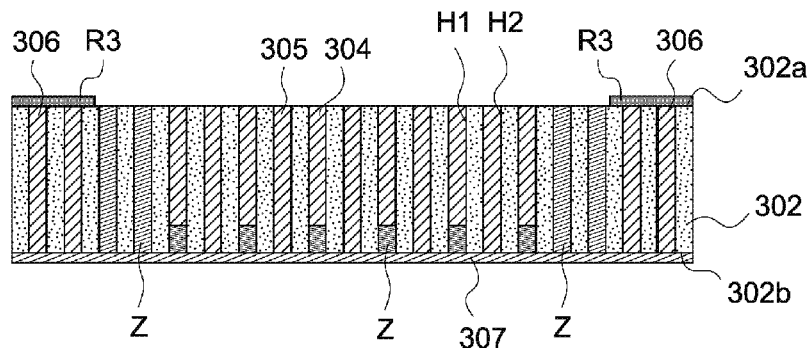
FIGS. 24A to 24C are schematic diagrams illustrating the process for manufacturing the stated capacitor.

Next, as illustrated in FIG. 24A, an etching resist R3 is formed in regions of the front surface 302a where the third inner conductors 306 are formed. The etching resist R3 can be patterned through photolithography, for example.

Figure 24B:
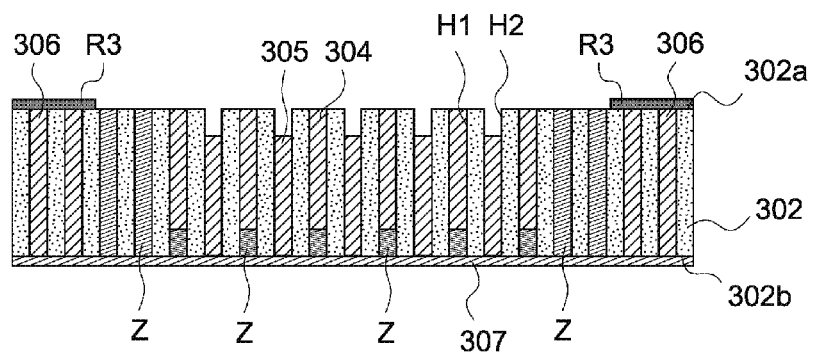

Next, the metal oxide 302 is electrolytically etched from the front surface 302a side using the second conductive layer 307. A surface layer portion of the second inner conductors 305 is removed as a result, as illustrated in FIG. 24B. The first inner conductors 304 are insulated from the second conductive layer 307 by the insulating material Z and are thus not removed by the electrolytic etching. The third inner conductors 306 are protected by the etching resist R3 and are thus not removed by the electrolytic etching.

Figure 24C:
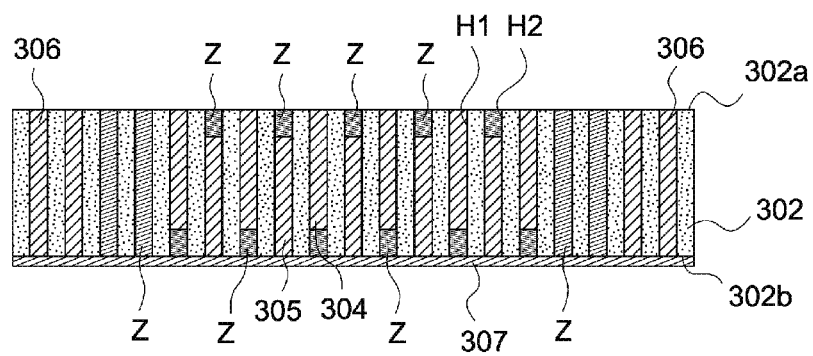

Next, spaces in the holes H2 are filled with the insulating material Z, as illustrated in FIG. 24C. The holes H2 are filled with the insulating material Z from leading ends of the third inner conductors 305 to the openings of the holes H2. The etching resist R3 is also removed through wet etching or the like.

Figure 25A:
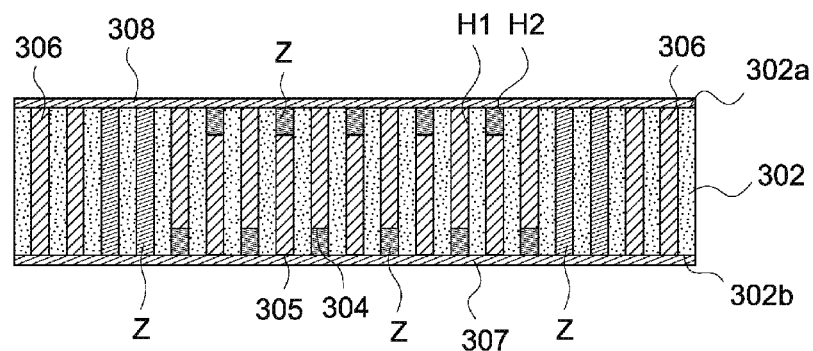
FIGS. 25A to 25C are schematic diagrams illustrating the process for manufacturing the stated capacitor.

Next, a third conductive layer 308 is formed from a conductive material on the front surface 302a, as illustrated in FIG. 25A. The third conductive layer 308 can be formed through various types of deposition techniques, such as sputtering, vacuum deposition, or the like.

Figure 25B:
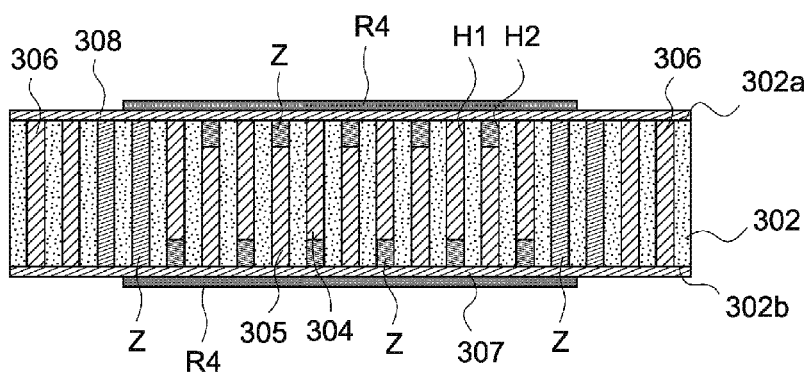

Next, as illustrated in FIG. 25B, an etching resist R4 is formed in regions of the second conductive layer 307 and the third conductive layer 308 where the first inner conductors 304 and the second inner conductors 305 are formed. The etching resist R4 can be patterned through photolithography, for example.

Figure 25C:
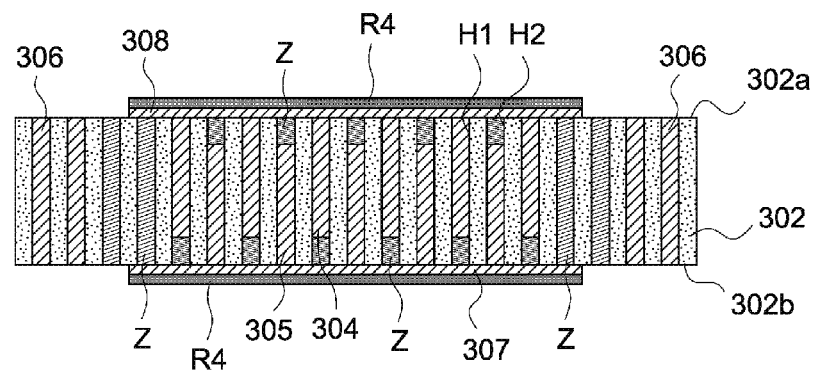

Next, the second conductive layer 307 and the third conductive layer 308 are patterned using the etching resist R4, as illustrated in FIG. 25C. The patterning can be carried out through various types of patterning methods, such as wet etching, dry etching, ion milling, CMP, or the like.

Figure 26A:
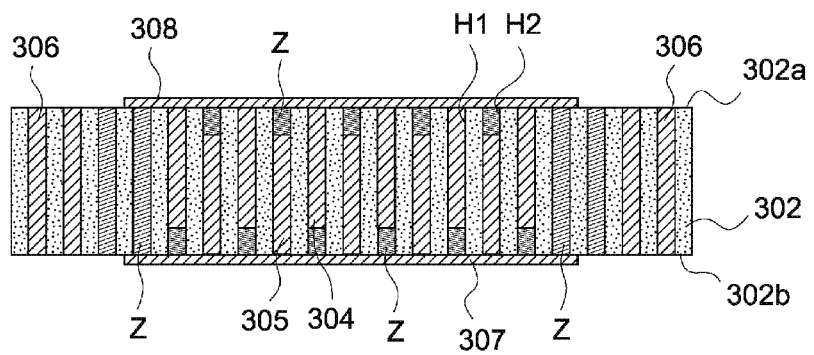
FIGS. 26A to 26C are schematic diagrams illustrating the process for manufacturing the stated capacitor.

Next, the etching resist R4 is removed, as illustrated in FIG. 26A. The etching resist R4 can be removed through wet etching, for example.

Figure 29B:
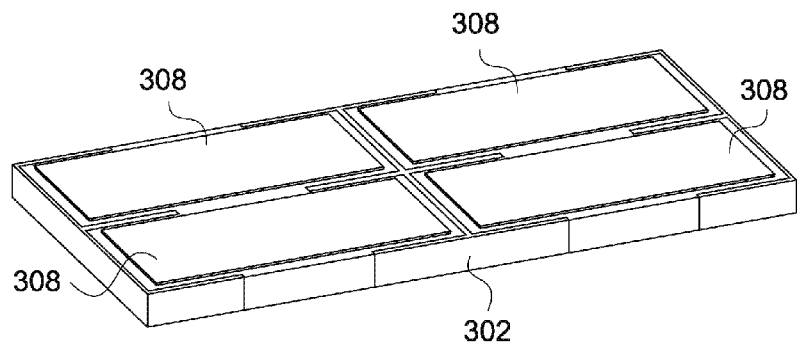

FIG. 29B is a perspective view illustrating the arrangement of the third conductive layer 308 in the capacitor structure. As illustrated in FIG. 29B, the third conductive layer 308 is disposed separately for each capacitor 100. The second conductive layer 307 is disposed in the same manner as the third conductive layer 308.

Figure 26B:
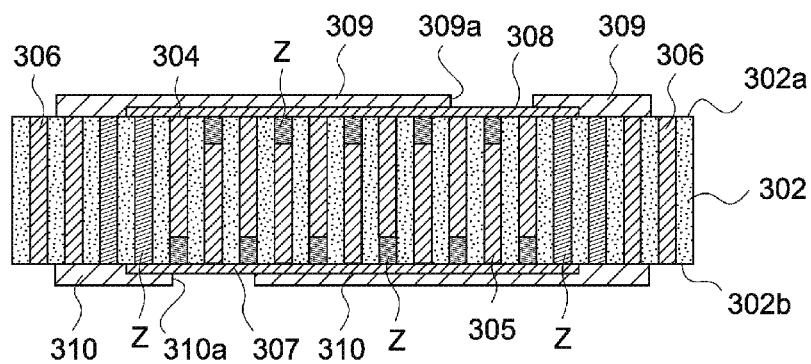

Next, as illustrated in FIG. 26B, a first protective layer 309 is formed upon the third conductive layer 308, and a second protective layer 310 is formed upon the second conductive layer 307. The first protective layer 309 and the second protective layer 310 can be formed by spreading a resin material upon the third conductive layer 308 and the second conductive layer 307 and then patterning the material through photolithography or the like. The patterning forms an opening 309a in the first protective layer 309 that exposes the third conductive layer 308, and forms an opening 310a in the second protective layer 310 that exposes the second conductive layer 307.

Figure 29C:
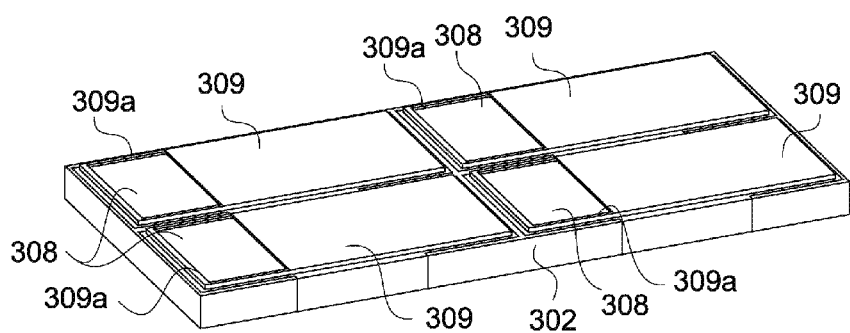

FIG. 29C is a perspective view illustrating the arrangement of the first protective layer 309 in the capacitor structure. As illustrated in FIG. 29C, the first protective layer 309 is disposed so as to cover the third conductive layer 308 on each capacitor 100, and is formed so as to be separated from the first protective layers 309 of adjacent capacitors 100. The second protective layer 310 is disposed in the same manner as the first protective layer 309. Selecting the material of the protective layers to include one of epoxy resin, silicone resin, polyimide resin, and polyolefin resin makes it possible to improve the insulation reliability with respect to humidity.

Figure 26C:
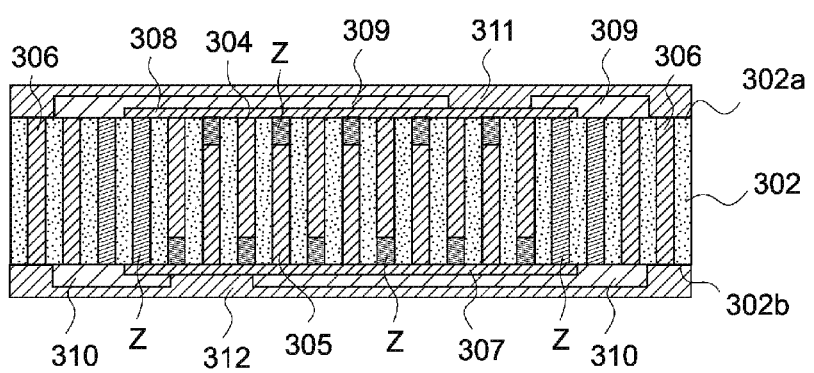

Next, as illustrated in FIG. 26C, a fourth conductive layer 311 is formed upon the entirety of the front surface 302a, and a fifth conductive layer 312 is formed upon the entirety of the rear surface 302b. The fourth conductive layer 311 and the fifth conductive layer 312 can be formed through various types of deposition techniques, such as sputtering, vacuum deposition, or the like.

Figure 27A:
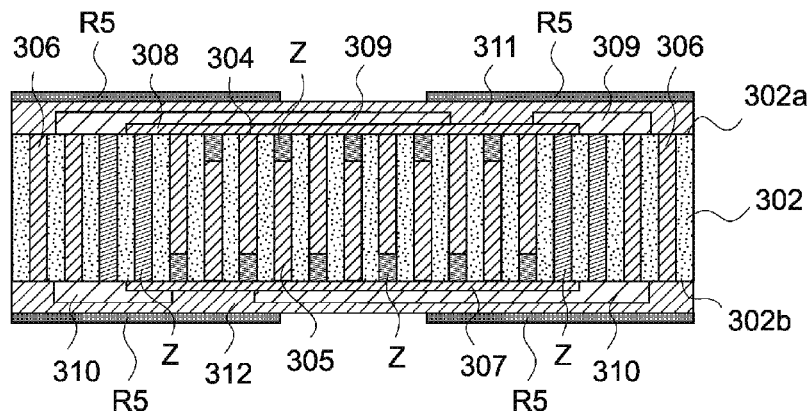
FIGS. 27A to 27C are schematic diagrams illustrating the process for manufacturing the stated capacitor.
Figure 27B:
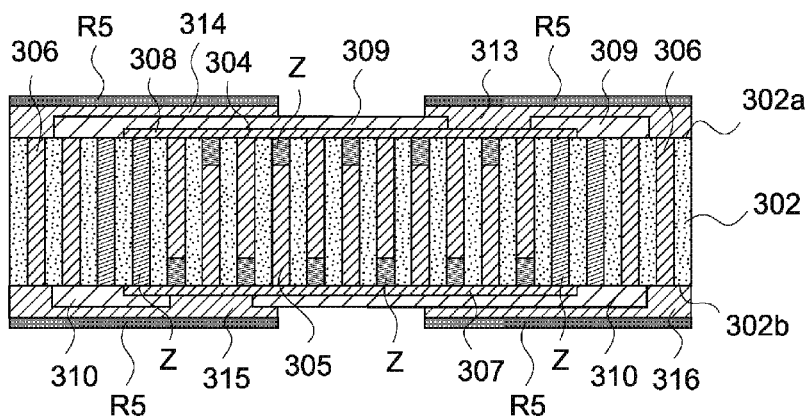
Figure 27C:
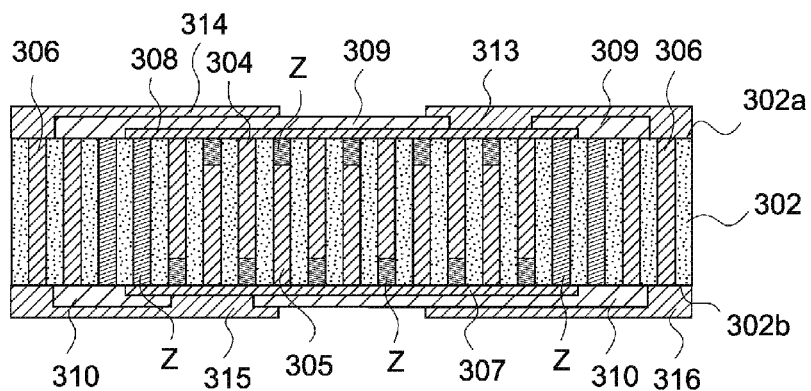

Next, an etching resist R5 is formed upon the fourth conductive layer 311 and the fifth conductive layer 312, as illustrated in FIG. 27C. The etching resist R5 can be patterned through photolithography, for example.

Next, the fourth conductive layer 311 and the fifth conductive layer 312 are patterned using the etching resist R5, as illustrated in FIG. 27B. As a result, the fourth conductive layer 311 is processed so that the first protective layer 309 is exposed in a central area of the fourth conductive layer 311, forming a sixth conductive layer 313 and a seventh conductive layer 314, and the fifth conductive layer 312 is processed so that the second protective layer 310 is exposed in a central area of the fifth conductive layer 312, forming an eighth conductive layer 315 and a ninth conductive layer 316. Note that of the conductive layers formed from the fourth conductive layer 311, the sixth conductive layer 313 is a conductive layer connected to the third conductive layer 308, and the seventh conductive layer 314 is a conductive layer connected to the third conductive layer 308. Likewise, of the conductive layers formed from the fifth conductive layer 312, the eighth conductive layer 315 is a conductive layer connected to the second conductive layer 307, and the ninth conductive layer 316 is a conductive layer connected to the second conductive layer 307. The patterning can be carried out through various types of patterning methods, such as wet etching, dry etching, ion milling, CMP, or the like.

Next, the etching resist R5 is removed, as illustrated in FIG. 27C. The etching resist R5 can be removed through wet etching, for example.

Figure 30A:
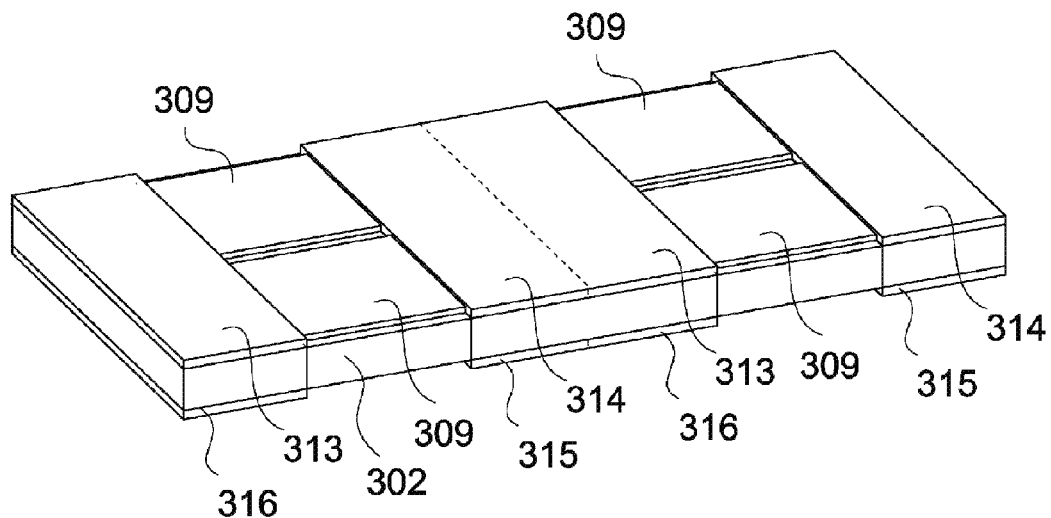
FIGS. 30A and 30B are perspective views illustrating the process for manufacturing a capacitor structure from which the stated capacitor is produced.

FIG. 30A is a perspective view illustrating the arrangement of the respective conductive layers in the capacitor structure. As illustrated in FIG. 30A, the sixth conductive layer 313 can be formed continuously with the sixth conductive layer 313 of an adjacent capacitor 100, and the seventh conductive layer 314 can be formed continuously with the seventh conductive layer 314 of an adjacent capacitor 100. Meanwhile, the sixth conductive layers 313 and the seventh conductive layers 314 can be formed continuously between adjacent capacitors 100. The arrangement of the eighth conductive layer 315 and the ninth conductive layer 316 is the same as that of the sixth conductive layer 313 and the seventh conductive layer 314.

Figure 28A:
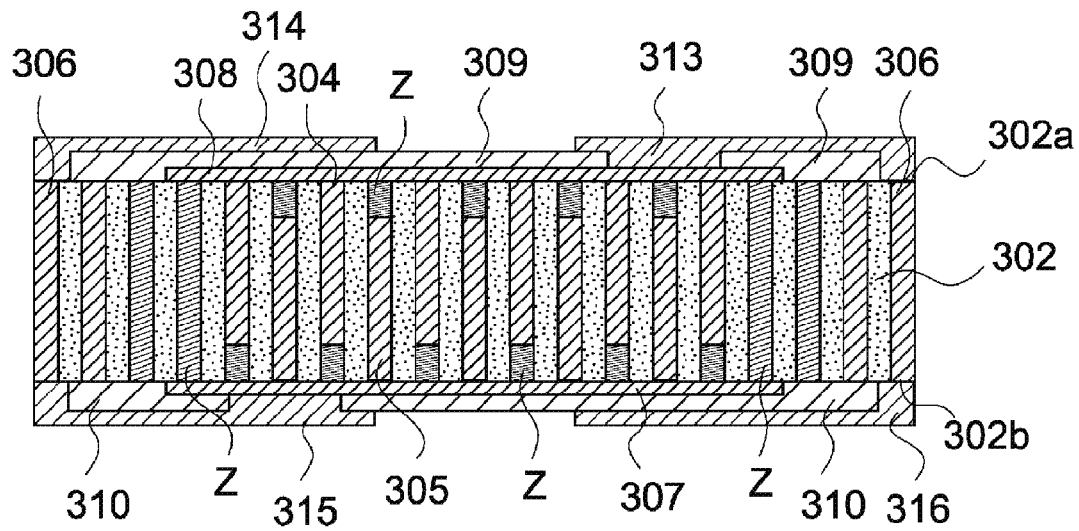
FIGS. 28A and 28B are schematic diagrams illustrating the process for manufacturing the stated capacitor.
Figure 30B:
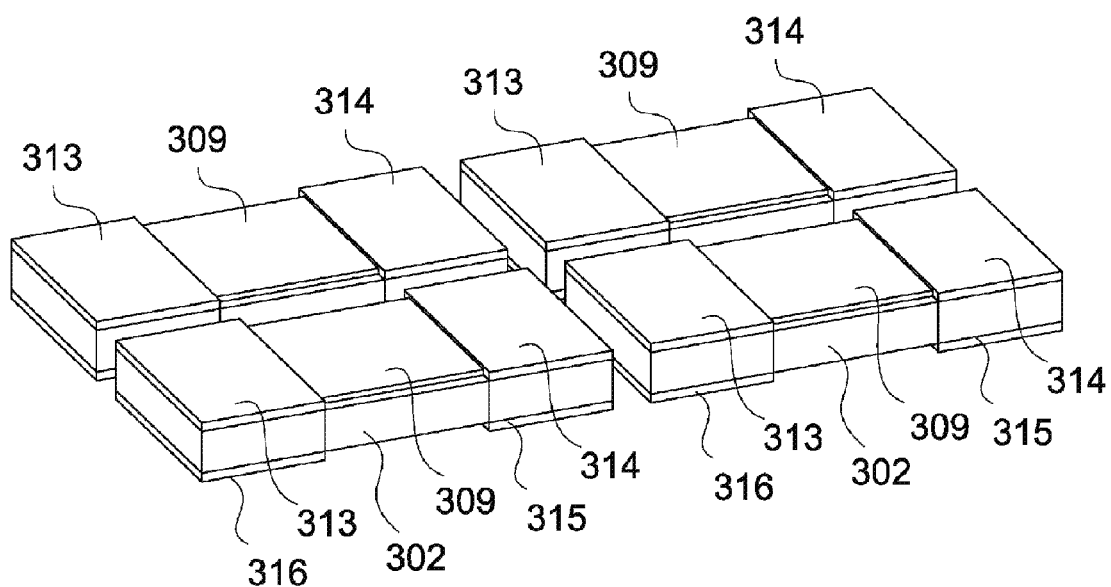

Next, the capacitor structure is divided into individual capacitors 100, as illustrated in FIGS. 28A, 30A, and 30B. The dividing can be carried out through dicing, laser scribing, or the like, for example. The division exposes the third inner conductors 306 at the cut surface (see FIG. 16). FIG. 30B is a perspective view illustrating the capacitor structure divided into four sections. As illustrated in FIG. 30B, cutting the metal oxide 302, the sixth conductive layer 313, the seventh conductive layer 314, the eighth conductive layer 315, and the ninth conductive layer 316 makes it possible to divide the structure.

Figure 28B:
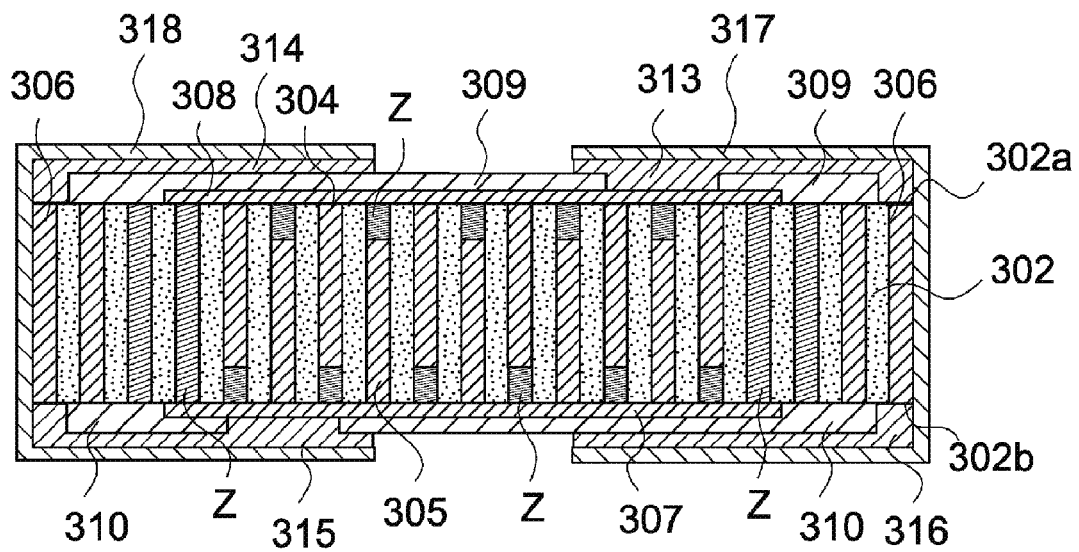

Next, a first outer electrode 317 and a second outer electrode 318 are formed, as illustrated in FIG. 28B. The first outer electrode 317 and the second outer electrode 318 can be formed by electroplating the structure. Specifically, the first outer electrode 317 is formed using the sixth conductive layer 313, the ninth conductive layer 316, and the third inner conductors 306 connected to those layers as the power supply for the electroplating, and the second outer electrode 318 is formed using the seventh conductive layer 314, the eighth conductive layer 315, and the third inner conductors 306 connected to those layers as the power supply for the electroplating.

Because the third inner conductors 306 are exposed at the cut surfaces in the above-described dividing process, the first outer electrode 317 and the second outer electrode 318 can be formed on that cut surface as well by using the exposed third inner conductors 306 as a power supply for the electroplating.

The capacitor 100 can be manufactured as described thus far. Note that the metal oxide 302 corresponds to the dielectric layer 101, the first inner conductors 304 to the first inner electrodes 102, and the second inner conductors 305 to the second inner electrodes 103. The third conductive layer 308 corresponds to the first conductive layer 104, the second conductive layer 307 to the second conductive layer 105, the first protective layer 309 to the first protective layer 107, and the second protective layer 310 to the second protective layer 108.

The sixth conductive layer 313 corresponds to the first external power electrode layer 110, the eighth conductive layer 315 to the second external power electrode layer 111, the seventh conductive layer 314 to the third external power electrode layer 112, and the ninth conductive layer 316 to the fourth external power electrode layer 113. The first outer electrode 317 corresponds to the first outer electrode 114, and the second outer electrode 318 to the second outer electrode 115. The insulating material Z that fills an entire through-hole corresponds to the insulation portions 106, and the insulating material Z that fills a through-hole along with the first inner conductor 304 or the second inner conductor 305 corresponds to the insulating portion 102a or the insulating portion 103a.

Of the above-described processes for manufacturing the capacitor 100, only the electroplating process is necessary after the capacitor structure has been divided, and in the electroplating process, it is sufficient for one of the front and rear surfaces of the structure to make contact with the power supply electrode, which makes it unnecessary to position the structure. In other words, according to this manufacturing method, the capacitor 100 can be manufactured without difficult processes such as positioning the individual capacitors obtained from the dividing. Furthermore, using electroplating makes it possible to reduce the number of processes as compared to a case where the first outer electrode 114 and the second outer electrode 115 are formed through sputtering.

<Modification Example>

Figure 31:
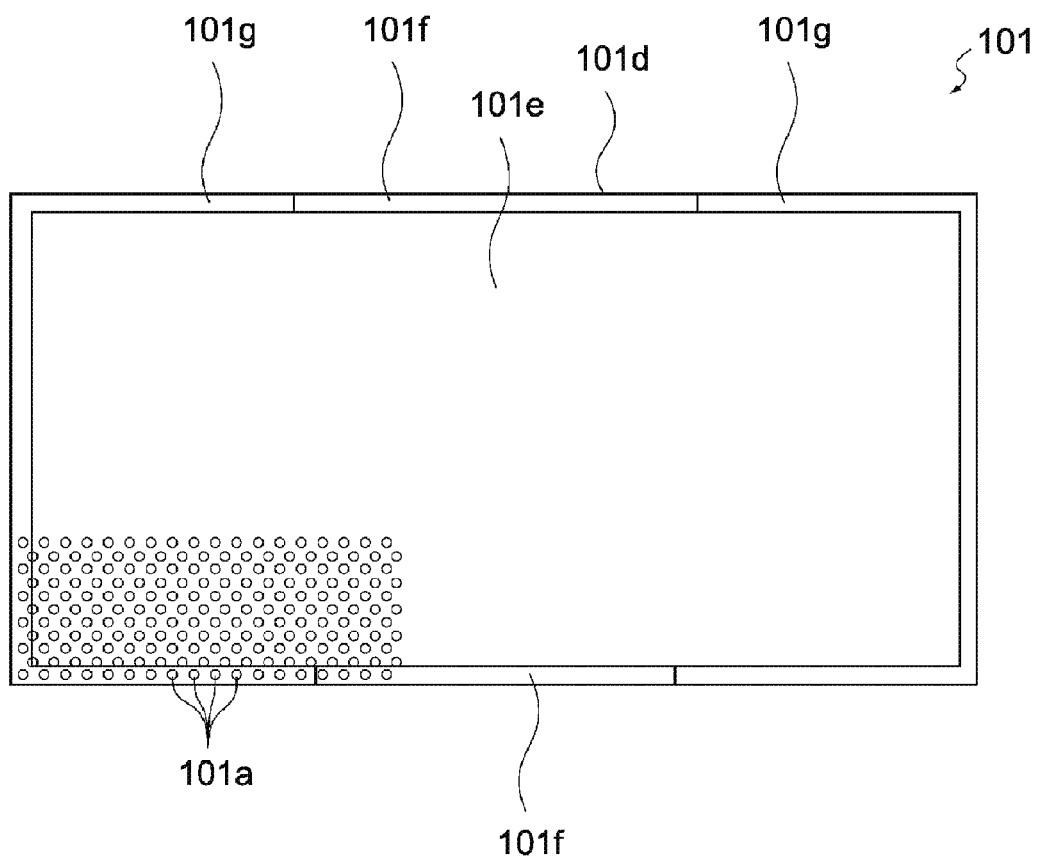
FIG. 31 is a plan view of a dielectric layer provided in a capacitor according to a variation on the present invention.

The arrangement of the capacitance region 101e, the insulating region 101f, and the conductive regions 101g in the dielectric layer 101 is not limited to that described above. FIG. 31 is a plan view of the dielectric layer 101 indicating the arrangement of the respective regions according to a modification example. As illustrated in FIG. 31, a configuration in which the insulating region 101f is not provided between the capacitance region 101e and the conductive regions 101g can also be employed.

However, in the case where the insulating region 101f is not provided between the capacitance region 101e and the conductive regions 101g, the capacitance region 101e and the conductive regions 101g will be adjacent to each other, and it is therefore necessary to form the first conductive layer 104 and the second conductive layer 105 with a high level of precision. A low patterning precision for the first conductive layer 104 and the second conductive layer 105 can cause those layers to extend beyond the conductive regions 101g and make contact with the through-conductor portions 109, resulting in short-circuits. Accordingly, providing the insulating region 101f between the capacitance region 101e and the conductive regions 101g is preferable from the standpoint of improving the insulation reliability.

Meanwhile, although the through-conductor portions 109 are described as connecting the first external power electrode layer 110 and the fourth external power electrode layer 113 or the second external power electrode layer 111 and the third external power electrode layer 112, it is not necessary for all of the through-conductor portions 109 to be connected to these external power electrode layers. The first outer electrode 114 and the second outer electrode 115 can be formed through electroplating as long as at least the through-conductor portions 109 exposed on the side faces 101d of the dielectric layer 101 are connected to external power electrode layers.

In addition, it is not necessary for the outer electrodes to be formed on the entire surfaces of the external power electrode layers as illustrated in FIG. 2, and the outer electrodes may be formed on part of the external power electrode layers.

It will be apparent to those skilled in the art that various modification and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A capacitor, comprising:
   a dielectric layer made of a dielectric material, having a first main surface, a second main surface opposite to the first main surface, side faces, and a plurality of through-holes that each connect with the first main surface and the second main surface;
   a first conductive layer made of a conductive material, disposed on the first main surface of the dielectric layer;
   a second conductive layer made of a conductive material, disposed on the second main surface of the dielectric layer;
   first inner electrodes made of a conductive material partially filling a first set of through-holes among the plurality of through-holes and directly connected to the first conductive layer;
   second inner electrodes made of a conductive material partially filling a second set of through-holes among the plurality of through-holes and directly connected to the second conductive layer;
   a first external power electrode layer made of a conductive material, disposed on the first main surface of the dielectric layer and connected to the first conductive layer;
   a second external power electrode layer made of a conductive material, disposed on the second main surface of the dielectric layer and connected to the second conductive layer;
   a first outer electrode made of a conductive material, disposed on the first external power electrode layer and on at least some of the side faces of the dielectric layer; and
   a second outer electrode made of a conductive material, disposed on the second external power electrode layer and on at least some of the side faces of the dielectric layer,
   wherein the dielectric layer has a capacitance region distanced from the side faces, and conductive regions, respectively, on both ends of the capacitance region, wherein said first set of the plurality of through-holes and said second set of the plurality of through-holes are located in the capacitance region, and wherein subsets of the plurality of through-holes, different from the first and second sets, are located in the respective conductive regions, and are completely filled with a conductive material so as to constitute through-conductor portions, some of the through-conductor portions being exposed on side faces of the dielectric layer.

2. The capacitor according to claim 1, wherein the conductive materials of the first outer electrode and the second outer electrode are plated metal.

3. The capacitor according to claim 1, wherein the dielectric layer further has an insulating region, provided between the capacitance region and the respective conductive regions, that includes some of the plurality of through-holes; and wherein said some of the plurality of through-holes located in the insulating region are unfilled or filled with an insulating material so as to constitute insulating portions.

4. The capacitor according to claim 1, further comprising:

a third external power electrode layer, made of a conductive material, that is disposed on the first main surface and electrically connected to the second external power electrode layer via the through-conductor portions; and a fourth external power electrode layer, made of a conductive material, that is disposed on the second main surface and electrically connected to the first external power electrode layer via the through-conductor portions.

5. The capacitor according to claim 1, wherein the dielectric layer is made of aluminum oxide; and wherein the capacitor further comprises:

a first protective layer, including one of epoxy resin, silicone resin, polyimide resin, and polyolefin resin, that covers the first conductive layer; and a second protective layer, including one of epoxy resin, silicone resin, polyimide resin, and polyolefin resin, that covers the second conductive layer.

* * * * *